(12) United States Patent
DeHart

(10) Patent No.: US 6,421,907 B1
(45) Date of Patent: Jul. 23, 2002

(54) METHOD FOR GROUPING A PLURALITY OF LEADS FOR A STATOR

(75) Inventor: Hobart DeHart, Austin, IN (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/409,493

(22) Filed: Sep. 30, 1999

Related U.S. Application Data

(60) Division of application No. 09/135,190, filed on Aug. 17, 1998, which is a continuation-in-part of application No. 09/122,950, filed on Jul. 27, 1998, now Pat. No. 6,073,336.

(51) Int. Cl.⁷ .......................... H02K 15/08; B23Q 41/02
(52) U.S. Cl. ........................ 29/596; 29/564.5; 29/33 P; 29/33 F; 198/346.1; 198/341.03
(58) Field of Search ............................. 29/564.5, 566.4, 29/33 P, 33 M, 33 F, 596, 598, 605, 734–736, 784; 198/346.1, 346.2, 341.01, 341.02, 341.03, 465.1, 570, 349

(56) References Cited

U.S. PATENT DOCUMENTS 4,357,742 A * 11/1982 Fisher et al. ................ 29/33 M
4,856,180 A * 8/1989 Barrett et al. .................. 29/596

* cited by examiner

*Primary Examiner*—Peter Vo
*Assistant Examiner*—A. Dexter Tugbang
(74) *Attorney, Agent, or Firm*—Gary J. Pitzer; Alexander M. Gerasimow; William R. Walbrun

(57) ABSTRACT

A methodology of grouping a plurality of leads of a stator is provided. The methodology includes the steps of positioning a lead secured to a first lead securing device to a predetermined position, removing the lead from the first lead securing device, rotating a second lead securing device to a predetermined position, and securing the lead to the second lead securing device.

12 Claims, 14 Drawing Sheets

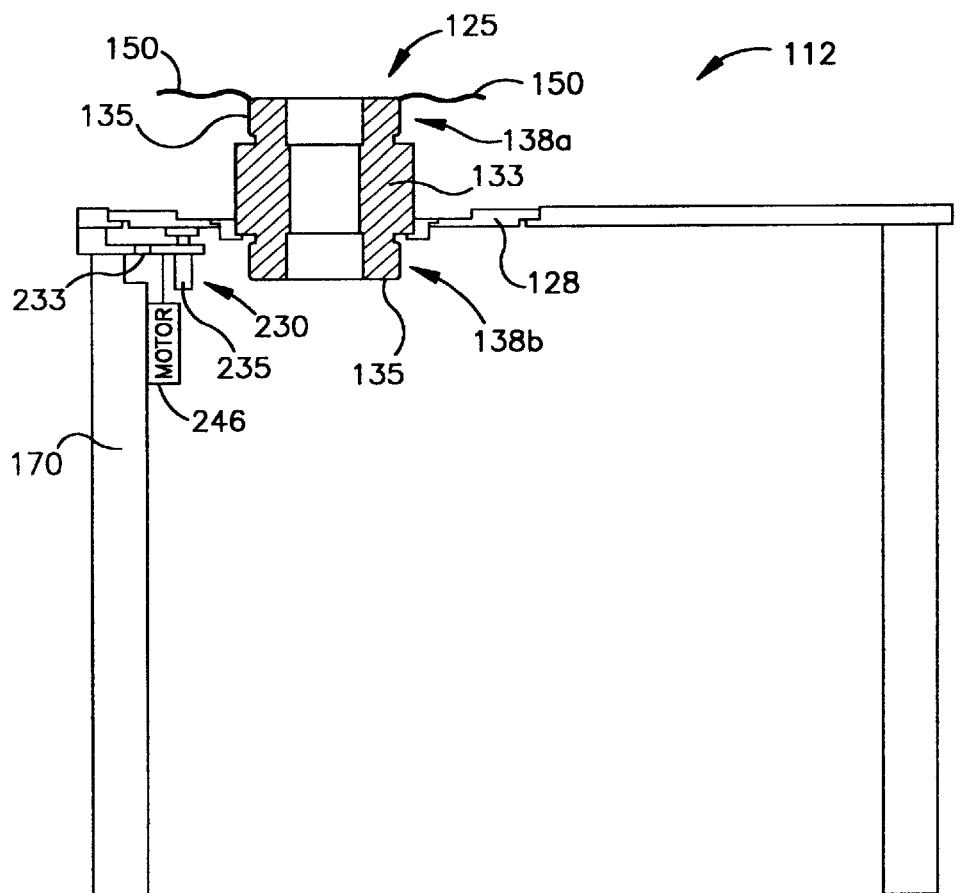
Fig.2
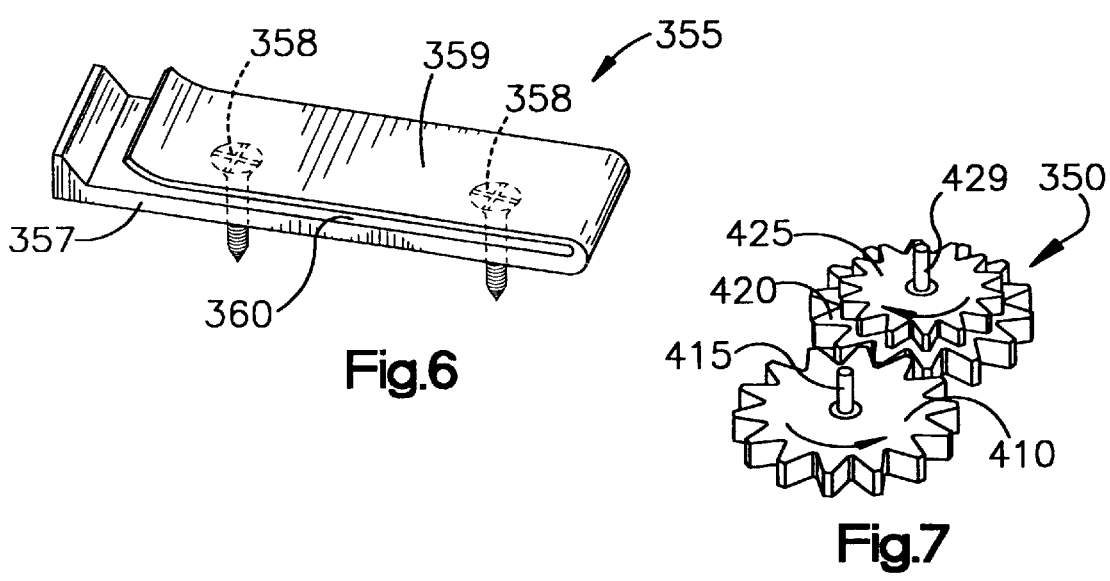
Fig.6
Fig.7

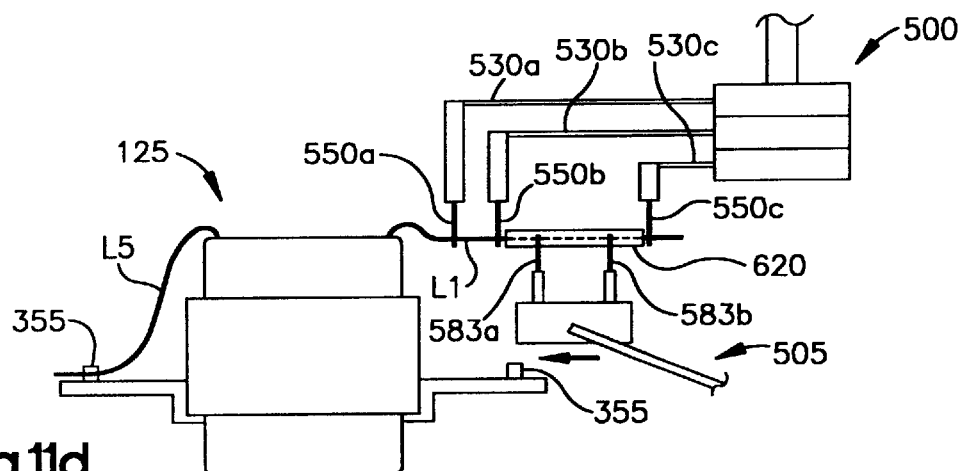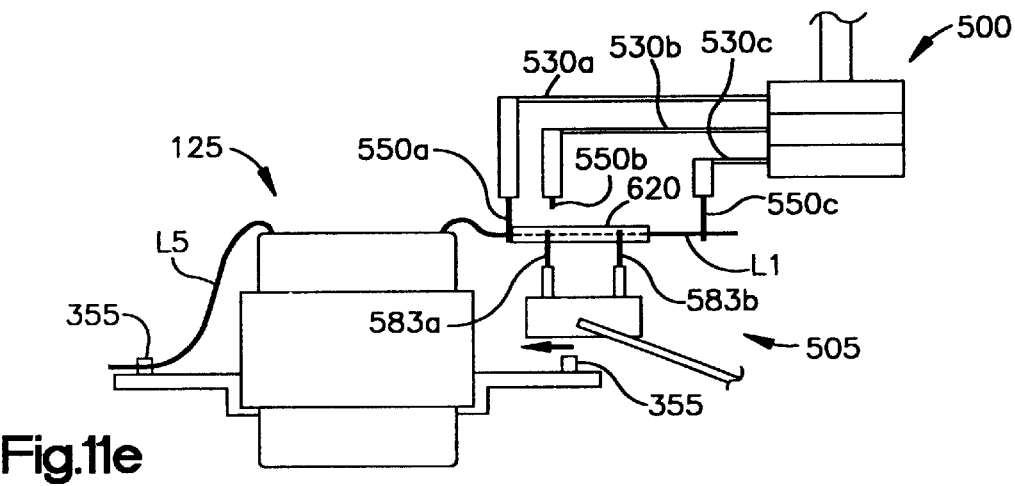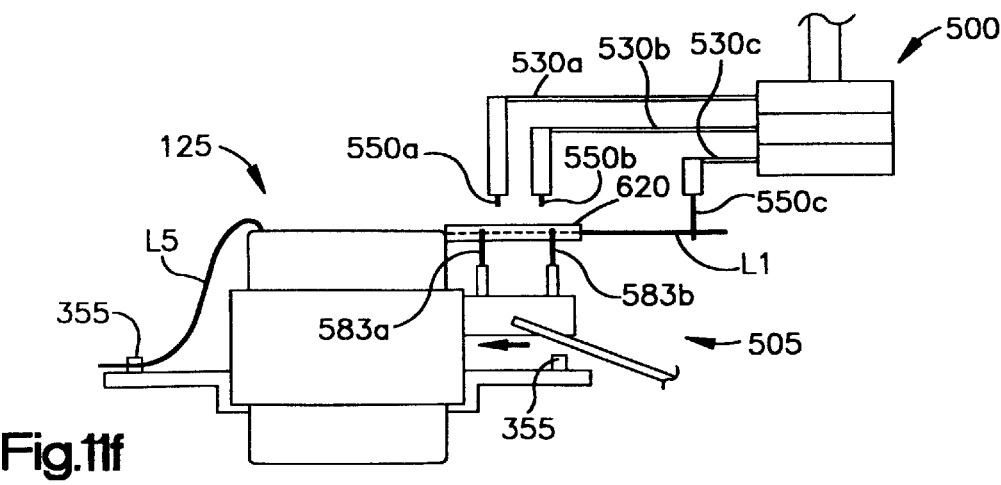

METHOD FOR GROUPING A PLURALITY OF LEADS FOR A STATOR

CROSS-REFERENCE TO RELATED APPLICATIONS

This application is a divisional of application Ser. No. 09/135,190 filed Aug. 17, 1998 which is a continuation-in-part of U.S. patent application Ser. No. 09/122,950 filed Jul. 27, 1998 now U.S. Pat. No. 6,073,336.

TECHNICAL FIELD

The present invention relates to a method and apparatus of manufacturing a stator. More particularly, the present invention relates to an automated method of shielding, grouping, and splicing stator leads prior to lacing of the leads and the stator coil end windings.

BACKGROUND OF THE INVENTION

Induction motors typically include a stator and a rotor. The stator includes a metallic core with a plurality of coils or windings running through the core. An alternating current is passed through these coils to generate an alternating magnetic flux field. The rotor has a plurality of coils or windings in which an alternating current is induced by the alternating magnetic flux field of the stator. The end coils or end turns of the stator are grouped together at axial ends of the stator and are often laced or stitched together to prevent their interfering with other components of a device. The end turns are often coated with an epoxy or resin subsequent to stitching. This coating helps reduce movement of the wires and provides an insulated barrier between the wires and other objects. Lacing in this case helps assure that the coils are tightly grouped together prior to coating.

Also extending from axial ends of the stator are several groups of bare wire leads. The leads serve to supply electrical power and control signals to the stator during operation. Because each of the leads carry signals of varying electric potential, the leads are typically insulated from one another with a non-electrically conductive shield or sleeve, respectively. The non-electrically conductive sleeve provides the leads with protection from shorting one another out in the event two or more leads happen to cross. During manufacture of the stator, placement of the sleeves on each lead is done manually by an operator on the manufacturing floor. More particularly, the operator initially retrieves pre-cuts sleeves and then manually threads each lead through its respective sleeve thereby providing the needed insulation. Additionally, because the length of many of the leads often is often not satisfactory to accomodate the lacing process, threaded extension leads are generally spliced to each of the stator leads. In order to splice a lead to an extension lead, an operator typically positions a connecting end of the lead and extension lead within a cramping tool which then completes the splicing procedure. Manual sleeving and splicing of each lead wire is tedious, time consuming, and involves ongoing operator involvement during the stator manufacture cycle.

As part of the manufacturing process, each stator is introduced to a station at which lacing thereof occurs. Use of a stator coil lacing machine avoids many of the manual operations otherwise necessary for lacing or stitching stator end coils and thus reduces labor costs and increases productivity and quality. At the lacing station, an operator typically lifts the stator and places the stator on the lacing machine. The lacing machine generally includes a worktable having a cylindrical arbor protruding upward from a central portion of the worktable. The arbor serves to facilitate proper placement of the stator on the lacing machine and aids in rotating the stator as lacing takes place. Once lacing is completed, the stator is lifted off the arbor and removed from the lacing machine and placed back on the pallet. The longer the longitudinal length of the arbor, the more effort that is required to place the stator thereon and remove the stator therefrom. Insertion and removal of the stator from the arbor is especially difficult given the oftentimes substantial weight of each stator which includes a heavy metallic core. While use of a lacing machine provides advantages in lacing the stator coils, the need to physically move the stator from the conveyer belt pallet to the lacing machine and back again to the pallet is a tedious process which impedes the overall manufacturing process.

One characteristic of some stator coil lacing machines is that the leads of the stator coil windings must be manually held and moved during lacing of the coils of the stator. Typically, a stator includes several groups of leads for supplying power and other signals to the stator. The leads must be held and moved in order to appropriately position the leads with respect to one or more lacing needles of the stator coil lacing machine. Oftentimes the leads are manually moved and positioned such that a portion of each lead is stitched to the coil in a desired manner. This allows the leads to extend from the stator at a desired location rather than loosely falling at random positions. The desired location from which the leads extend is often caused to correspond to openings in the stator housing which provide the leads with access outside the housing. Thus, one or both of the hands of the operator of a stator coil lacing machine is/are often preoccupied in positioning the leads during lacing of the coils of the stator. This has the disadvantages of preventing the operator from performing other tasks during stator coil lacing and thus lowers his or her productivity. In addition, an operator needs to be cautious of mistakenly coming in contact with the moving components of the stator coil lacing machine such as the lacing needles.

Therefore, what is needed is a method and apparatus for manufacturing a stator which minimizes the amount of manual intervention needed so as to overcome the shortfalls discussed above and others.

SUMMARY OF THE INVENTION

Briefly, a method and apparatus for automating the manufacturing process of a stator is provided. The stator includes a metal core with conducting wires oriented axially through the metal core. The conducting wires are grouped together into end windings which converge at upper and lower ends of the metal core. A series of leads extend from the upper and lower ends of the metal core and provide the stator with electrical control and power signals.

During manufacture, the stator is moved through a series of manufacturing stations in which a sequence of automated steps are performed to the stator at each of the stations. In particular, the present invention provides for the stator to be introduced to a first station in which the leads of the stator are automatically shielded or sleeved in order to electrically isolate the leads from one another. The stator is then moved to a second station where the leads are automatically grouped according to a predefined criteria. Following grouping, the stator is moved to a third station where a selected set of leads are automatically spliced to extension wires to allow a proper length of each lead wire to extend from the stator following the lacing procedure. Finally, the stator is moved to a lacing station where both the end windings and leads are automatically laced according to a predefined lacing protocol.

Automated processes which occur at each of the stations are performed while the stator is situated on a rotatable support such as a pallet having a rotating assembly disposed therein. The rotatable support is moved from station to station via a conveyer belt or the like and allows the stator to be automatically rotated to various positions at each station. Further, at each of the first, second, and third stations, a robotic arm is used to facilitate placement and positioning of the leads. The robotic arm may, for instance, be controlled by a central computer which controls the robotic arm to perform certain predefined tasks. Thus, using a combination of the robotic arm and the rotatable support, the present invention substantially reduces the amount of time operators need to spend at each of these stator manufacturing stations and increases the overall speed, accuracy, and efficiency at which such steps are performed.

According to one particular aspect of the present invention a method of shielding a lead of a stator as the stator is situated on a pallet is provided. The method includes the steps of selecting the lead by a first robotic device and positioning a sleeve over at least a portion of the lead by a second robotic device.

According to another aspect of the present invention, a system for manufacturing a stator is provided. The system includes a pallet including a base portion, a first ring rotatably disposed within the base portion for supporting the stator, and a second ring rotatably disposed in the base portion, the second ring including a plurality of clips for releasably securing a plurality of leads extending from the stator. The system further includes a conveyer system for supporting the pallet and moving the pallet between a plurality of stations and a means for sleeving at least one of the plurality of leads of the stator at one of the plurality of stations.

According to still another aspect of the present invention, a method for grouping a plurality of leads of a stator situated on a pallet is provided. The pallet includes a rotatable assembly having a plurality of lead securing devices. The method includes the steps of positioning one of the plurality of leads secured to a first of the plurality of lead securing devices to a predetermined position, removing the one of the plurality of leads from the first of the plurality of lead securing devices, rotating a second of the plurality of lead securing devices to the predetermined position, and securing the one of the plurality of leads to the second of the plurality of lead securing devices.

According to yet another aspect of the present invention a system for grouping leads of a stator is provided. The system includes a pallet having an inner rotatable ring for supporting the stator and an outer rotatable ring with a plurality of lead securing devices. The system further includes a means for removing at least one of the leads from one of the plurality of lead securing devices and placing the at least one of the leads into another of the plurality of lead securing devices.

According to yet another aspect of the present invention a method of splicing a lead of a stator to an extension lead is provided. The method includes the steps of positioning by a first robotic device the lead of the stator to a crimping tool, positioning by a second robotic device the extension lead to the crimping tool, and splicing by the crimping tool the lead to the extension lead.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings:

FIG. 2 is a side elevation view partly in section of a stator situated on a pallet in accordance with the present invention;

FIG. 6 is a perspective view of a clip used in conjunction with the pallet;

FIG. 7 is a perspective view of a gear assembly used in the pallet;

FIG. 11d is a side view of the second robot arm incrementing the sleeve over the lead wire;

FIG. 11e is a side view of the second robot arm incrementing the sleeve over the lead wire;

FIG. 11f is a side view of the second robot arm completing positioning of the sleeve over the lead wire;

DETAILED DESCRIPTION OF THE INVENTION

Figure 1:
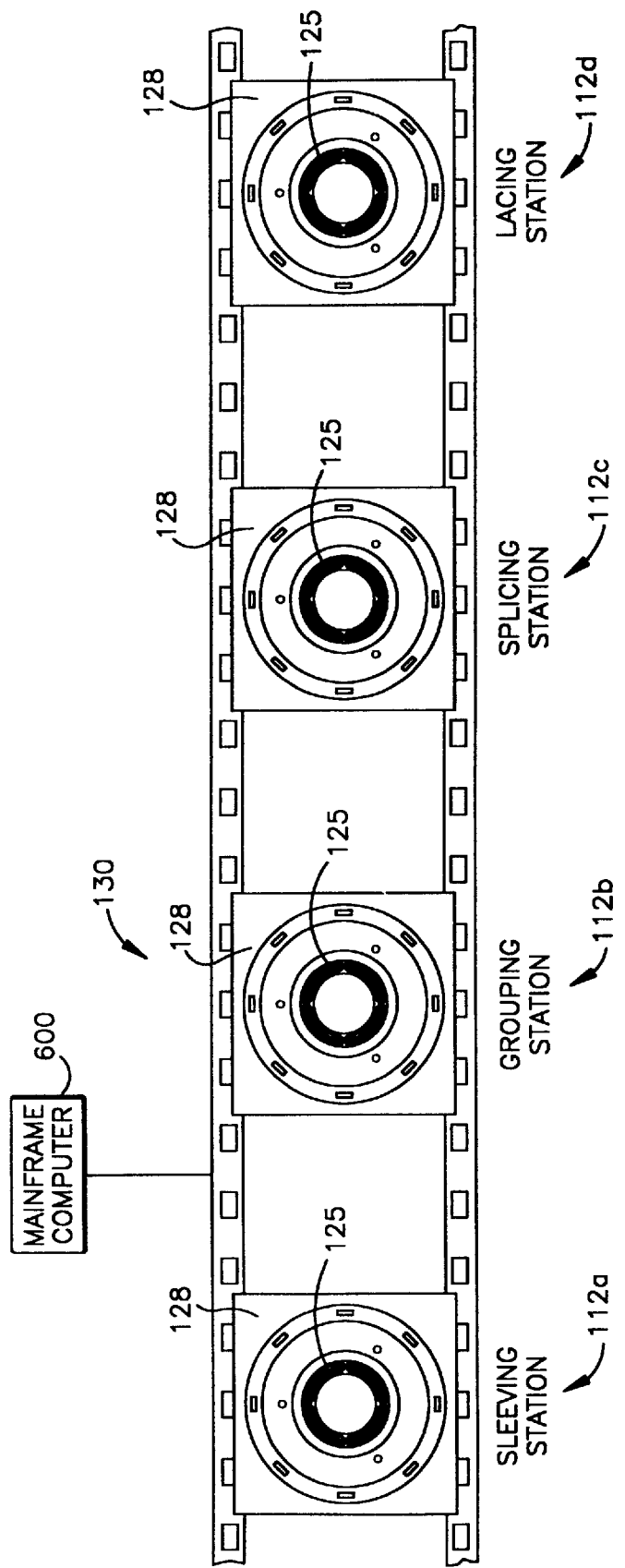
FIG. 1 is a top view of a conveyer system passing through four stator manufacturing stations in accordance with the present invention.

The present invention will now be described with reference to the drawings in which like reference numerals are used to refer to like elements throughout.

Turning now to FIGS. 1 and 2, a manufacturing facility is depicted in which a plurality of supports such as pallets 128 are situated in a spaced apart relationship along a conveyer system 130. A stator 125 situated on each of the pallets 128 is moved through a series of manufacturing stations 112a–d (hereinafter collectively referred to as manufacturing stations 112) by the conveyer system 130. The stator 125 includes a metal core 133 (FIG. 2), for example, formed from stacked laminations with conducting wires oriented axially through the metal core 133. The conducting wires are grouped together into end coils or end windings 135 which converge into a generally toroidal shaped configuration at upper and lower ends 138a, 138b, respectively, of the metal core 133. Leads 150 extend from the end windings 135 situated on the upper end 138a of the metal core 133 and are used to provide the stator 125 with electrical control and power signals as is known in the art. For example, the leads 150 may provide the stator 125 with three phase power, thermal relay signals, etc. It will be appreciated that the stator 125 may include any number of sets of leads 150 depending on the operational requirements of the stator 125.

During manufacture, the stator 125 is moved through the series of manufacturing stations 112 during which a sequence of automated steps are performed to the stator 125 during its manufacturing cycle. In particular, the present invention provides for the stator to be introduced to the first station 112a in which the leads 150 of the stator 125 automatically are sleeved in order to electrically isolate the leads 150 from one another. The stator 125 is then moved to the second station 112b where the leads 150 automatically are grouped according to a predefined criteria. Following grouping, the stator 125 is moved to the third station 112c where a selected set of leads 150 are spliced together and/or to extension wires to allow a proper length of each lead 150 to extend from the stator prior to lacing. Finally, the stator 125 is moved to the fourth station 112d where both the end windings 135 and leads 140 automatically are laced according to a predefined lacing protocol. It will be appreciated, that while the present invention describes these manufacturing steps occurring in sequential fashion, it is possible for the stator 125 to be introduced to other stations in the manufacturing cycle both before and after any of the stations referred to herein and the present invention is not limited to a case in which all of these steps are performed back to back.

Figure 3:
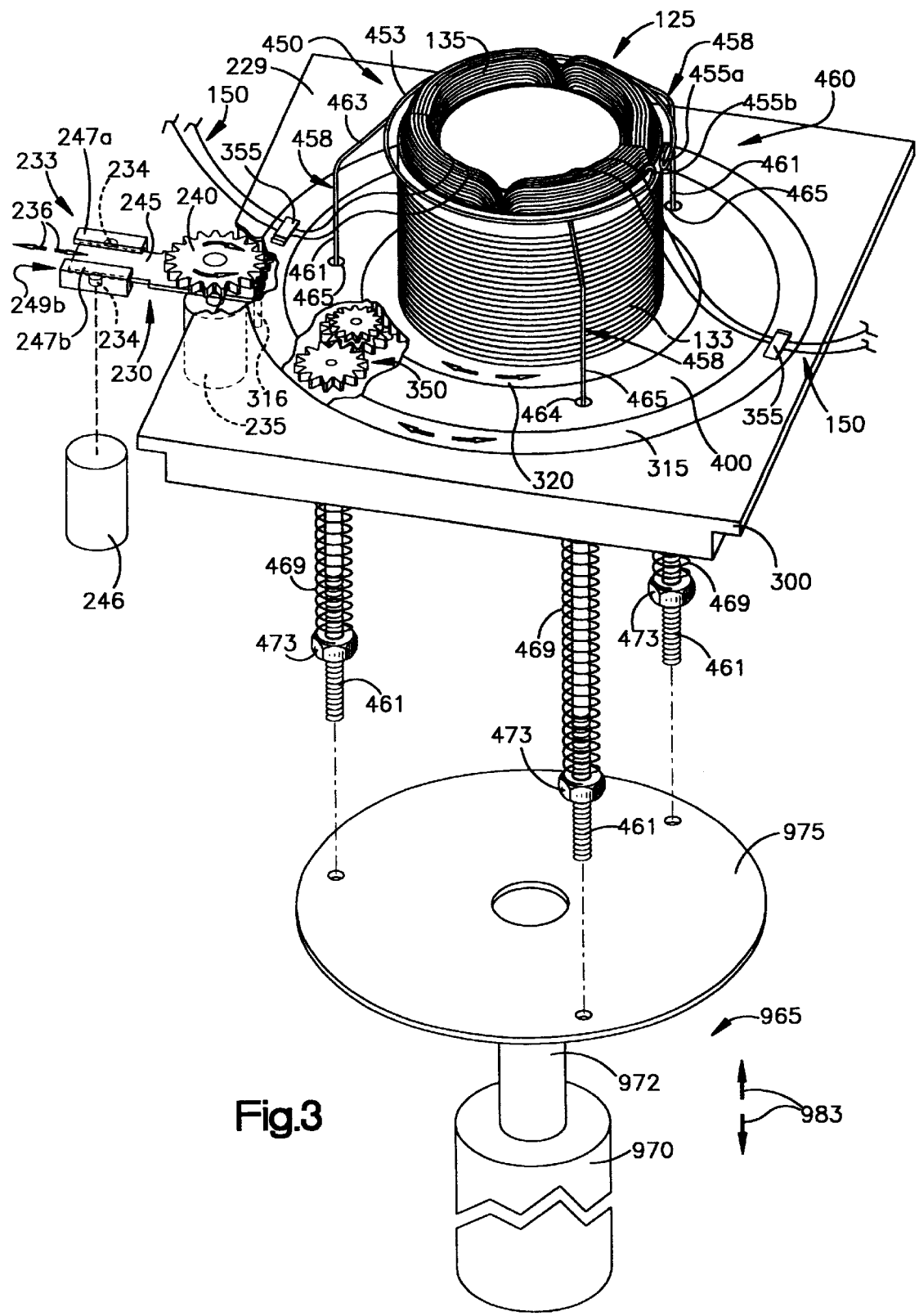
FIG. 3 is a partly exploded front view in perspective of the stator situated on a pallet at one of the stations.

Referring now to FIGS. 2 and 3, each station 112 includes a slidable gear assembly 230 which is coupled to a station table 170 via track 233. The slidable gear assembly 230 includes a bi-directional motor 235 coupled to drive gear 240 and is capable of rotating the drive gear 240 in both a clockwise and counter clockwise direction. A traction plate 245 is rigidly attached to the top of the bi-directional motor 235 and interfaces with the track 233 to allow the slidable gear assembly 230 to move horizontally in a direction depicted by arrows 236. A pair of traction wheels 234 secured to the traction plate 245 provide for movement of the slidable gear assembly 230 within track 233. The track 233 includes first and second track members 247a and 247b each mounted to the lacing table 170 using conventional mounting means and each track member 247a, 247b defines a respective groove 249a and 249b, for receiving the traction plate 245 and traction wheels 234 of the slidable gear assembly 230. A motor 246 (FIG. 2), attached to a side of the lacing table 170, provides motive force to the traction wheels 234 of the slidable gear assembly 230 for movement along the track 233. Alternatively, the traction wheels 234 may be controlled by a separate servo motor.

Turning now to FIGS. 3–7, the pallet 128 is described in more detail. The pallet 128 includes a base portion 229 which is generally rectangular in shape and includes a pair of flanges 300 suitable for situating the pallet 128 on the conveyer system 130 (FIG. 2) for movement through the manufacturing facility. To provide for rotation of the stator 125 at each of the respective stations 112, the pallet 128 further includes a ring assembly 310 disposed therein. More particularly, the ring assembly 310 includes an outer ring 315 and an inner ring 320.

Figure 4:
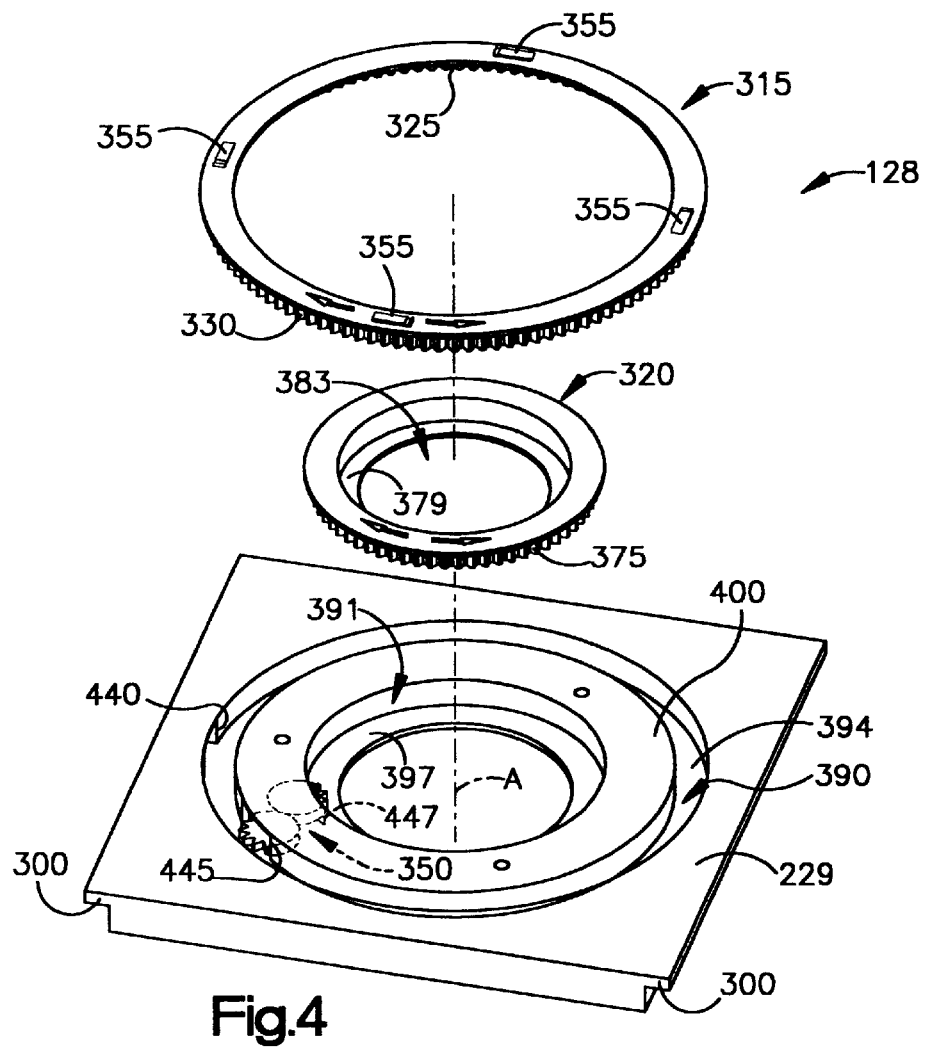
FIG. 4 is an exploded perspective view of the pallet.
Figure 5:
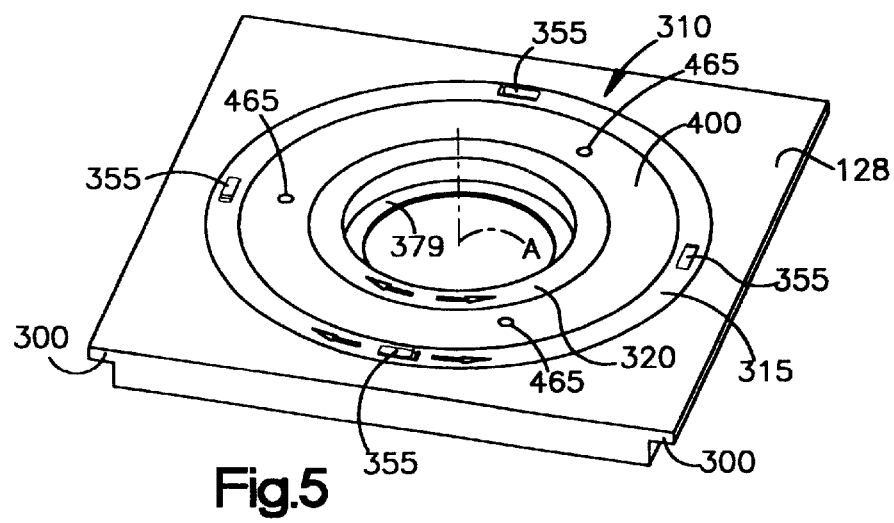
FIG. 5 is a perspective view of the pallet.

As best seen in FIG. 4, the outer ring 315 includes inner and outer gear teeth 325, 330, respectively. The outer gear teeth 330 have a pitch angle and spacing suitable for engaging with drive gear 240 (FIG. 3). The inner gear teeth 225 have a pitch angle and spacing suitable for engaging with gear assembly 250. The outer ring 315 further includes lead clips 355 connected thereto. As will be discussed in more detail below, the lead clips 355 aid in positioning leads for operations done at each of the respective stations 112.

As best seen in FIG. 6, the lead clips 355 include a base portion 357 and a cord securing member 359. The base portion 357 is secured to a top surface of the outer ring 315 using flat head screws 358 or the like. The securing member 359 is folded across a top surface 360 of the base portion 357 and provides a downward force against the top surface 360 for releasably securing items therebetween. It will be appreciated that while the present embodiment describes clips 355 attached to the outer ring 315 for securing the leads 150, other fasteners or securing devices may alternatively be used.

Returning again to FIG. 4, the inner ring 320 includes outer gear teeth 375 disposed about a periphery of the inner ring 320. The outer gear teeth 375 have a pitch angle and spacing which is configured to interface with gear assembly 350. The inner ring 320 includes a recessed step 379 which is sized to receive the metal core 133 of the stator 125. The recessed step 379 provides for mitigating wobbling and/or falling of the stator 125 situated therein during the manufacture cycle. Furthermore, an opening 383 defined in a central portion of the inner ring 320 provides room for the end windings 135 on the lower end 138b (FIG. 2) of the stator core 133 to extend to an underside of the pallet 128 so that the end windings 135 are accessible for lacing or other manufacturing steps.

Both outer ring 315 and inner ring 320 are rotatably disposed in the pallet 128 to provide rotation of the stator 125 at each of the stations 112. More particularly, the outer ring 315 is disposed in an outer ring receiving channel 390 (FIG. 4) defined in the pallet 128. A bottom surface 394 of the outer ring receiving channel 390 includes a brass bushing (not shown) to aid in rotation of the outer ring 315 within channel 390. The inner ring 320 is situated within an inner receiving groove 391 which includes inner ring receiving ledge 397. Similar to the outer ring receiving channel 390, the inner ring receiving ledge 397 includes a brass bushing to allow for rotation of the inner ring 320 during operation. It will be appreciated that ball bearings and/or other devices may be used in place of the brass bushings to aid in rotation of the inner ring 320 and outer ring 315.

The outer receiving channel 390 and inner receiving groove 391 define a stationary middle ring 400. The gear assembly 230 allows for synchronized movement of the outer ring 315 and inner ring 320, and is connected to an underside of middle ring 400. As best seen in FIG. 7, the gear assembly 350 includes three gears. A first gear 410 is coupled to the underside of the middle ring 400 via gear axle 415 and interfaces with the inner gear teeth 325 of the outer ring 315. A second and third gear 420 and 425, respectively, are rigidly attached to one another and are coupled to the underside of the middle ring 400 via gear axle 429. The pitch angle and spacing of the second gear is configured to interface with the gear teeth of the first gear 410. The pitch angle and spacing of the third gear 425 is configured to interface with the outer gear teeth 375 of inner ring 320. The third gear 425 is also configured to provide for both the outer ring 315 and inner ring 320 to move at the same angular rotation about central axis "A" of the pallet 128 during lacing. More particularly, in the present embodiment the outer ring 315 has ten times the number of gear teeth 330 as the drive gear 240. Thus, for example, if the drive gear 240 were to rotate at a speed of ten revolutions per minute, the outer ring 315 would rotate at a speed of one revolution per minute. As the outer ring 315 is rotated, the first gear 410 of the gear assembly 350 correspondingly is rotated via the inner gear teeth 325 of the outer ring 315. The first gear 410, in turn, engages rotation of both the second gear 420 and third gear 425. Finally, the third gear 425 engages rotation of the inner ring 320 via outer gear teeth 375. In order that the inner ring 320 is rotated at the same rotational speed as the outer ring 315, the third gear 425 is specifically configured to have the appropriate the number of gear teeth to provide for equal rotational speed. For example, if the first and second gears 415 and 420 are rotated at the same rotational speed as the drive gear 240, then the third gear 425 preferably would be configured to have one-tenth the number of gear teeth as the inner ring 320 thereby providing for the outer ring 315 and inner ring 320 rotate at the same speed.

Returning to FIG. 4, the pallet 128 further includes gear engaging apertures 440, 445 and 447 to allow for interaction between the drive gear 240 and outer ring 315, and between the outer ring 315 and the inner ring 320 via gear assembly 350. More particularly, the outer gear engaging aperture 440 is defined along a periphery of the outer ring channel 390 and is sized to allow the drive gear 240 to engage with the outer gear teeth 330 of the outer ring 315. Furthermore, inner and outer gear assembly apertures 445 and 447, respectively, are defined along an inner and outer periphery of the middle ring 400 and are each sized to allow the gear assembly 350 to engage with the outer ring 315 and inner ring 320.

Referring back to FIG. 3, each pallet 128 further includes a lead lift assembly 450 which is primarily used during the lacing process. The lead lift assembly 450 includes ring portion 453 having a diameter just slightly larger than a diameter of the metal core 133 of the stator 125 such that the ring portion 453 may be freely lifted and lowered about the metal core 133. The ring portion 453 further includes a pair of hooks 455a, 455b which define a stitch window 460 through which a lacing needle 869 reaches the end windings 135 during lacing. The ring portion 453 is movably secured to the pallet 128 via three lead lift legs 458. Each leg 458 includes a vertical section 461 and an angled section 463. Each angled section 463 is rigidly coupled to the ring portion 453 and is angled sufficiently to position the ring portion 453 about the metal core 133. Each vertical section 461 passes through a corresponding lead lift aperture 465 in the middle ring 400 of the pallet 128. A spring 469 is secured to a distal end of each vertical section 461 using a lock nut 473. An opposite end of the spring 469 abuts an underside of the middle ring 400. The spring 469 provides a downward force on the lead lift assembly 450 to facilitate lowering of the lead lift assembly 450 following lacing at the lacing station 112d as discussed in more detail below. Of course, other means for aiding in lowering the lead lift assembly 450 such as placing weights on the distal end of the vertical section 461 may alternatively be used.

Figure 8:
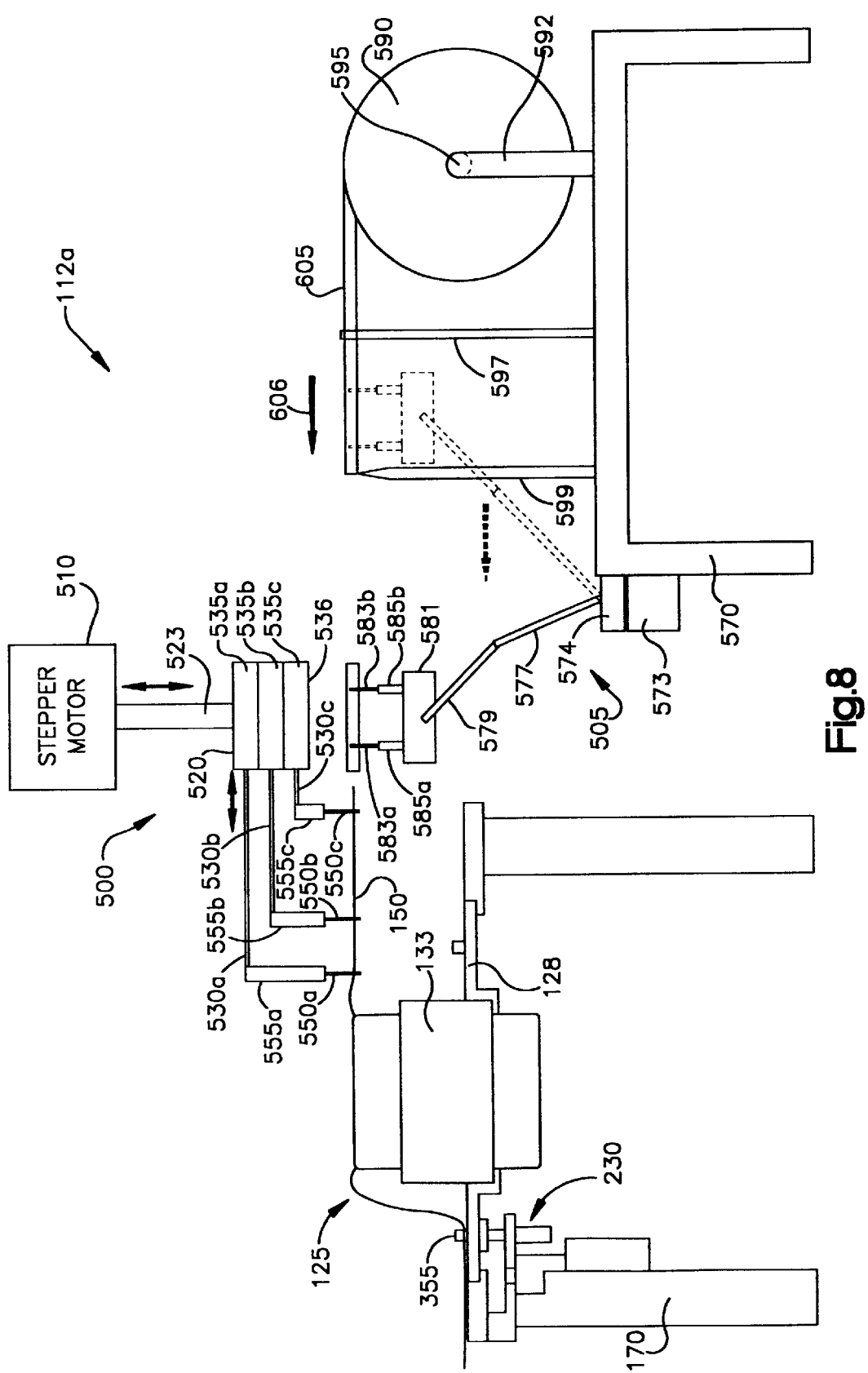
FIG. 8 is a diagrammatic side view of a first station in which leads of the stator are automatically sleeved using a robotic device.
Figure 9:
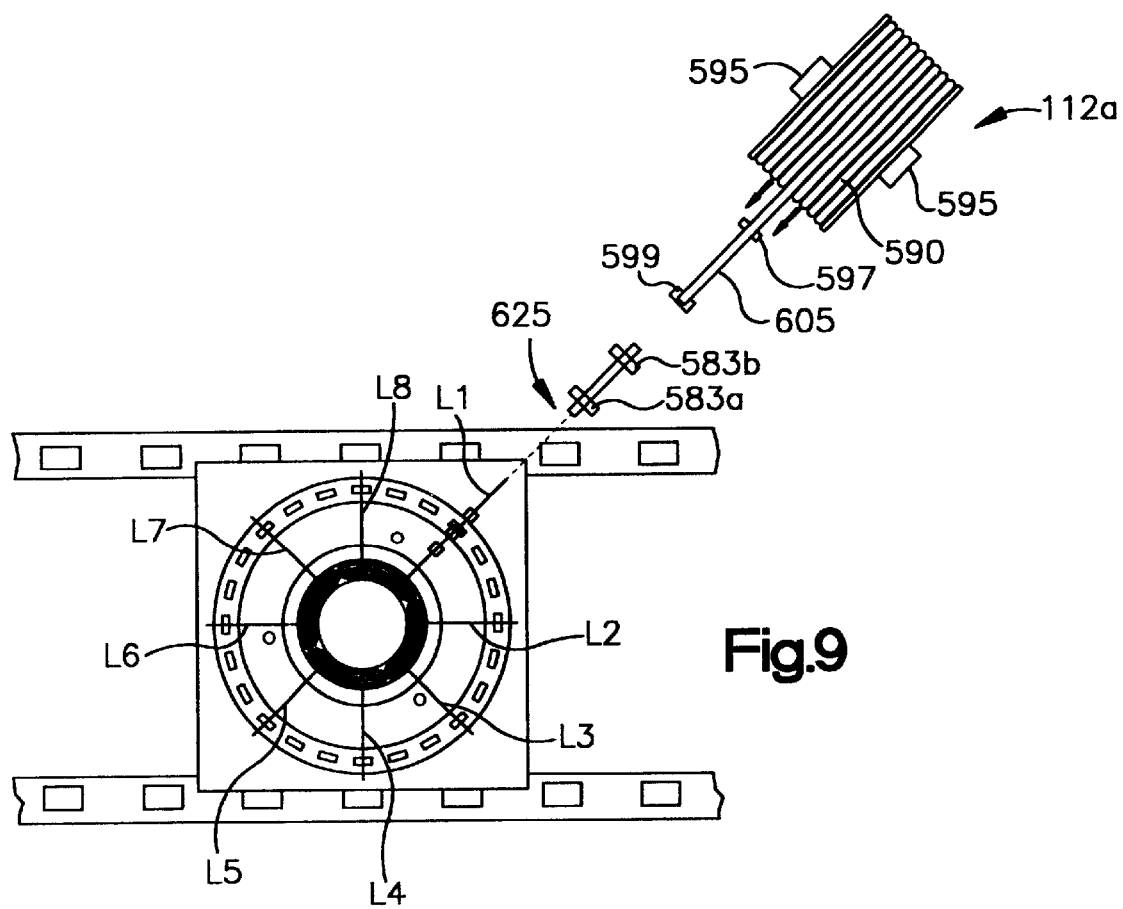
FIG. 9 is a diagrammatic top view of a first station in which leads of a stator are automatically sleeved using the robotic device.

Turning now to FIGS. 8 and 9, the first station 112a is shown in more detail at which the leads 150 of the stator 125 are sleeved automatically. In order to provide automated sleeving, the first station 112a includes a first and second robotic device 500, 505, respectively. The first robotic device 500 and second robotic device 505 each are coupled to a main frame computer system 600 (FIG. 1) which supply the devices with the appropriate instructions for carrying out the operations described herein.

Figure 10:
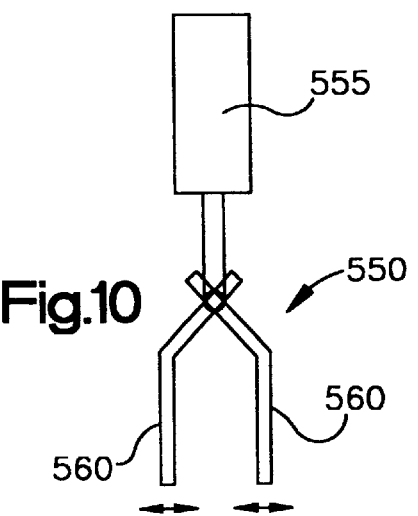
FIG. 10 is a side view of a finger clamp of the robotic device.

The first robotic device 500 is mounted to a ceiling or other rigid structural member in the manufacturing facility. The robotic device 500 includes a stepper motor 510 providing vertical movement to an arm positioning assembly 520 via a support stem 523. In the present embodiment, three retractable arms 530a, 530b, 530c (collectively referred to as retractable arms 530) extend from the arm positioning assembly 520 and are positionable in a substantially horizontal direction by the arm positioning assembly 520. In order to individually position each retractable arm 530, the arm positioning assembly 520 includes three positioning motors 535a, 535b, 535c (collectively referred to as positioning motors 535) disposed within a housing 536 of the arm positioning assembly 520. Each positioning motor 535 couples to a respective retractable arm 530 and applies conventional techniques to extend and retract the retractable arm 530 from the housing 536. A distal end of each retractable arm 530 is coupled to a respective finger clamp 550a, 550b, 550c (collectively referred to as finger clamp 550) through a finger clamp control unit 555a, 555b, 555c (collectively referred to as control unit 555). As shown in FIG. 10, each finger clamp 550 includes a pair of fingers 560 which are positionable by the control unit 555 to lift and secure items therebetween.

The second robotic device 505 at the first station 112a is mounted to a work table 570 via a horizontal and vertical positioning motor 573. The positioning motor 573 includes conventional electrical and mechanical components for positioning a robot arm. Further, the positioning motor 573 includes a conventional resistance detector 574 which serves to detect the amount of resistance in movement of a robot arm the positioning motor 573 is experiencing at any given time. An arm assembly 575 coupled to the positioning motor includes a first and second retractable arm member 577, 579. Each retractable arm member 577, 579 may be elongated or shortened in response to signals received from the positioning motor 573 to obtain desired positioning of the arm members 577, 579. An end of the second arm member 579 is coupled to a finger clamp support 581. A first and second finger clamp 583a, 583b (collectively referred to as finger clamp 583) each couple to the finger clamp support 581 through a respective finger clamp control unit 585a, 585b (collectively referred to as control unit 585). The finger clamps 583 and finger clamp control units 585 each are similar in structure to the finger clamps 550 discussed above with respect to the first robotic device 500. Robotic devices similar to those described herein and suitable for use in connection with the present embodiment are commercially available from Robo-Tech Systems, Inc., Westerville, Ohio and Robotic Accessories, Tipp City, Ohio.

Also included at the first station 112a is a spool of sleeve material 590. The spool 590 is supported on the work table 570 by way of support member 592 and is rotatable about axis 595. A sleeve guide post 597 mounted to the work table 570 aids in guiding the electrically insulating sleeve material 605 as it is dispensed from the spool 595. Further, a conventional sleeve cutter 599 also is mounted to the work table 570 and serves to cut the sleeve material 605 to an appropriate size as discussed in more detail below.

Prior to introducing a stator 125 to the first station 112a, each of the leads 150 of the stator 125 manually is pre-positioned under a preassigned clip 355 on the outer ring 315. For instance, as shown in FIG. 9, eight leads labeled L1, L2, L3, L4, L5, L6, L7 and L8 each are positioned under a respective clip 355 preassigned for that lead 150. The preassigned positions of each lead 150 is also stored in the main frame computer 600 and is used by the computer 600 to determine the particular tasks to be performed to each lead 150 as discussed in more detail below.

Upon introducing the pallet 128 to the first station 112a in which the leads 150 are sleeved automatically, the slidable gear assembly 230 (FIG. 3) engages with the gear teeth 330 disposed about an outer periphery of the outer ring 315 and serves to rotate the ring assembly 328 according to instructions received from the computer 600. In particular, the ring assembly 328 is rotated until lead L1 is positioned at a sleeving post 625 (FIG. 9) where sleeving takes place as discussed in more detail below. Further, upon engagement of the slidable gear assembly 230 with the outer ring 315, the locking pin disposed within the pallet 128 is released to allow the inner an outer rings 320, 315 to rotate about a central axis of the pallet 128.

Figure 11A:
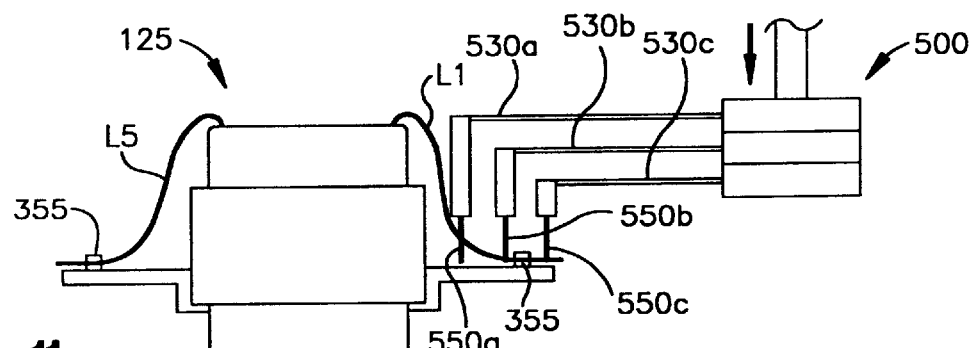
FIG. 11a is a side view of a first robot device obtaining a lead wire from beneath the clip.

Next, as shown with respect to FIG. 11a the computer 600 directs the first robotic arm 500 to remove the lead 150 currently introduced to the sleeving post 625 from the clip 355 which in this case is lead L1. In particular, the stepper motor 510 lowers the arm positioning assembly 520 to a first predetermined position such that the third finger clamp 550c substantially is at the same height as an end of the lead L1. Next, the arm positioning assembly 520 horizontally positions the third finger clamp 550c to a second predetermined position such that the end of lead L1 is positioned between the fingers 560 (FIG. 10) of the third finger clamp 550c. Following this step, the fingers 560 are moved towards one another so as to capture and secure the end of lead L1.

Figure 11B:
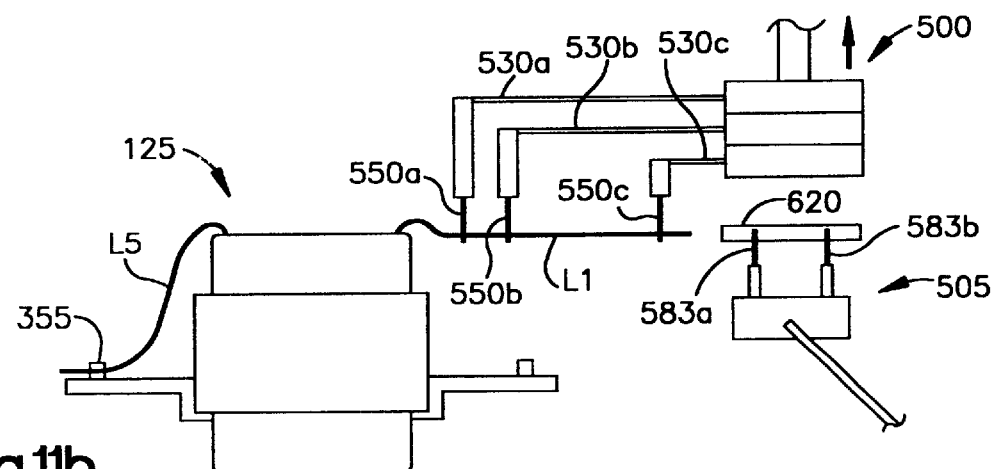
FIG. 11b is a side view of a second robot device positioning a sleeve adjacent the lead wire.

Referring now to FIG. 11b, once the end of lead L1 is secured by the third finger clamp 550c, the robotic device 500 positions the end to a predetermined x, y, and z position in space. Next, the first and second finger clamps 550a, 550b, respectively, secure intermediate portions of the lead L1 thereby holding the lead L1 in a substantially horizontal plane.

During the time in which the first robotic device 500 properly secures and positions the lead L1, the second robotic device 505 is directed by the computer 600 to obtain an appropriately sized sleeve for placement on the lead L1. More particularly, in order to obtain the appropriately sized sleeve, the second robotic device 505 initially positions its first and second finger clamps 585a, 585b to secure a portion of the sleeve material 605 dispensed from the spool as shown in dashed lines in FIG. 8. Securing of the sleeve by the first and second finger clamps 585a, 585b is done similar to that described above with respect to the finger clamps 555 of robot device 500. Once secured, the robot device 505 pulls the sleeve off the spool 590 in a direction indicted by arrow 606 until an predetermined amount of sleeve material has passed over the sleeve cutter 599. Next, the computer 600 directs the sleeve cutter 599 to slice the sleeve in a conventional manner. Following this step, the second robot device 505 directs the cut sleeve 620 to a position adjacent the end of the lead L1 as shown in FIG. 11b.

Figure 11C:
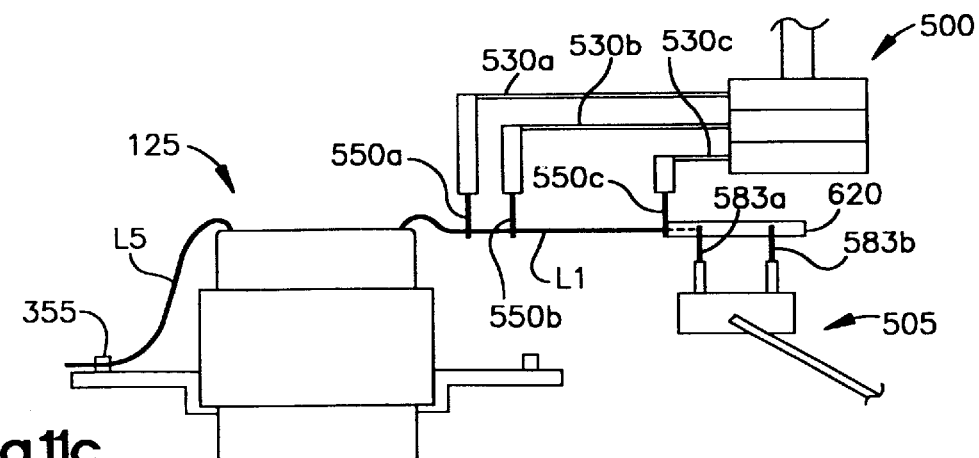
FIG. 11c is a side view of the second robot arm incrementing the sleeve over the lead wire.

As shown in FIG. 11c, once lead L1 and sleeve 620 are positioned properly, the computer 600 directs the second robot device 505 to move the sleeve towards the third finger clamp 550c such that a receiving aperture (not shown) in the sleeve 620 receives the end of lead L1. Upon reaching the third finger clamp 550c, the first robot device 500 directs the third finger clamp 550c to release the lead L1.

Referring now to FIG. 11d, following release of lead L1 by the third finger clamp 550c, the robot device 505 moves the sleeve 620 until an end of the sleeve abuts the second finger clamp 550b. Once positioned at the second finger clamp 550b, the opposite end of the sleeve 620 will have cleared the third finger clamp 550c. Thus, the third finger clamp 550c again secures the end of lead L1 to provide tension to lead L1 during the sleeving process. Also, the second finger clamp 550b releases the lead L1, thereby allowing the sleeve 620 to be moved past that location.

As shown in FIG. 11e, following release of the lead L1 by the second finger clamp 550b, the second robot 505 moves the sleeve 620 towards the first finger clamp 550a. Once the sleeve 620 abuts the first finger clamp 550a, the first finger clamp 530a releases the lead L1.

Finally, as shown in FIG. 11f, the second robot device 505 moves the sleeve until an end of the sleeve abuts a stator slot (not shown) in the metal core 133 through which the lead L1 extends from the stator 125. Determination of when the sleeve 620 has been properly positioned is accomplished by the second robot 505 by monitoring the amount of resistance faced by the robot arm 577, 579 in moving the sleeve as measured by the resistance detector 574 (FIG. 8). Thus, when a the robot device 505 determines that a predetermined amount of resistance has been sensed indicating that the sleeve 620 may not be moved any closer to the stator core 133, the robot device 505 is directed to disengage the sleeve 620. Following release of the sleeve 620 by the second robot device 505, the first robot device 500 re-secures the lead under the clip 355 from which it was originally taken.

Upon completion of sleeving of lead L1, the slidable gear assembly 230 engages with the gear teeth 330 disposed about an outer periphery of the outer ring 315 to index the ring assembly 328 until each of the remaining leads L2–L8 is positioned at a sleeving post 625 (FIG. 9) and is sleeved in accordance with the procedures set forth above with respect to FIGS. 11a–11f. Thus, the present invention provides an automated sleeving process which increases the efficiency of the overall manufacturing cycle and allows operators to be free to perform other tasks.

Figure 12:
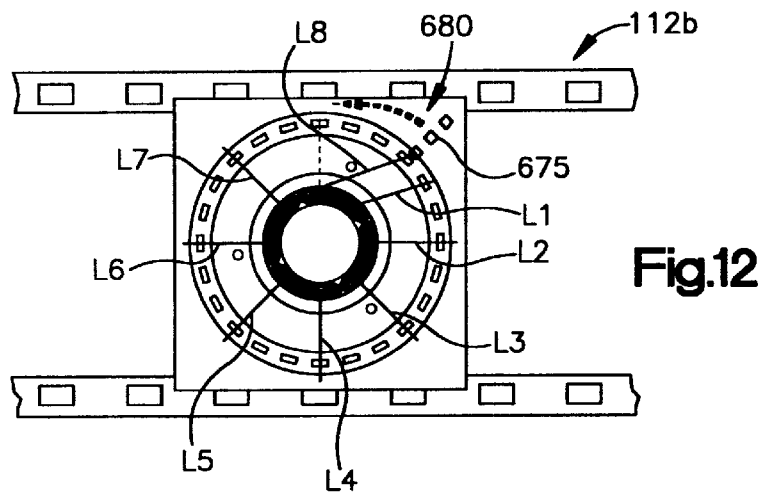
FIG. 12 is a top view of the second station in which the leads are grouped in accordance a predefined grouping protocol.
Figure 13:
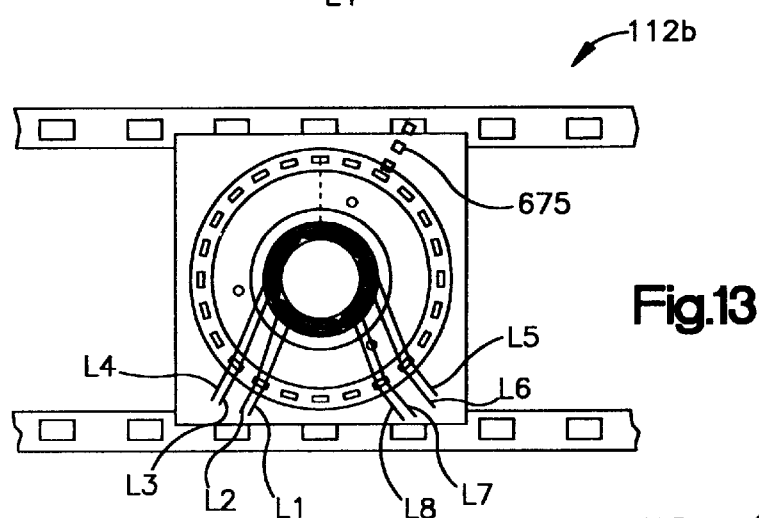
FIG. 13 is top view of the second station following grouping of each lead.

Turning now to FIGS. 12 and 13, the second station 112b is depicted at which the leads 150 of the stator 125 are grouped under an pre-assigned clip 355 on the outer ring 315 as determined by the computer 600. Grouping of the leads 150 enables them to be connected in an appropriate manner at the third station 112c. For instance, those leads which need to be jumpered or parallel connected together may be grouped under one clip while those leads to which a stranded lead extension needs to be added may be placed under their own respective clip. In order to select and move each lead 150 to its assigned location, the second station 112b includes a third robot device 675 which is substantially similar to the first robot device 500 described above with respect to the first station 112a, and therefore is not again discussed in detail for sake of brevity.

Upon introducing the pallet 128 to the second station 112a, a slidable gear assembly 230 at the second station 112b engages with the ring assembly 328 and rotates the ring assembly 328 according to instructions received from the computer 600. In particular, the gear assembly 230 initially is directed to index the ring assembly 328 such that each lead L1–L8 is introduced to a grouping station. At the grouping station 680 the third robot device 675 lifts the lead introduced to the grouping station 680 from the clip 355 in a manner similar to that described above with respect to FIG. 11a. Next, the gear assembly 230 is directed to rotate the ring assembly 328 until the clip 355 under which the lead 150 held by the third robot device 675 is to be positioned is at the grouping station 680. Finally, the third robot device 675 re-clips the lead under the assigned clip 355. For instance, as shown in FIG. 12, lead L8 has been repositioned from its original clip 355 to its assigned clip 355. This process continues until the leads 150 have been re-positioned according to the grouping protocol stored in the computer 600. For instance, as shown in FIG. 13, the grouping protocol of the present embodiment has grouped leads L1 and L2 under one clip, leads L3 and L4 under another clip and leads L5–L8 under their own individual clips.

Referring now to FIG. 13, the third station 112c is shown in more detail. The third station 1 12c provides for automated splicing and crimping of the leads 150 prior to lacing. Further, the third station 112c provides for automated sleeving of any spliced connections to facilitate insulation of the leads 150.

In order to connect two or more leads, the third station 112c includes a conventional crimping tool 700. Also included at the third station 112c is a fourth and fifth robot device 710, 720, respectively. The fourth robot device 710 substantially is similar to the first robot device 500 discussed above with respect to the first station 112a. Likewise, the fifth robot device 710 substantially is similar to the second robot device 505 discussed above with respect to the first station 112a. As such, details regarding the forth and fifth robot devices 710, 720 is not again provided for sake of brevity.

Also positioned at the third station 112c is a spool of insulated threaded lead wire 725 and a spool of sleeve material 730. Both spool 725 and spool 730 have associated therewith a respective guide post 740,742 and a respective cutting device 745,748. The spools 725, 730, guide posts 740, 742 and cutting devices 745, 748 are all similar in construction to the spool 590, guide post 597 and cutting device 599 described above with respect to FIG. 8.

Referring now to FIGS. 15a–15d, the operations performed at the third station 112c is described in more detail.

Figure 14:
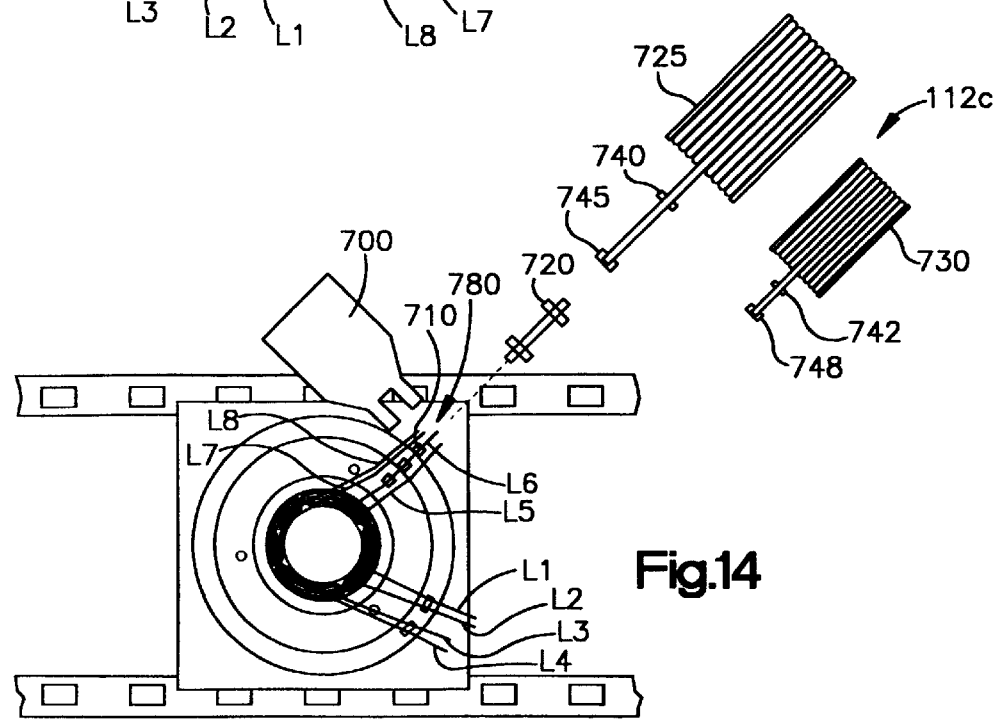
FIG. 14 is a top view of the third station in which a crimping tool splices or connects leads.

Upon introducing the pallet 128 to the third station 112a, a slidable gear assembly 230 at the third station 112c engages with the ring assembly 328 and rotates the ring assembly 328 according to instructions received from the computer 600. In particular, the gear assembly 230 is directed to index each clip 355 currently securing one or more leads to a crimping station 780 (FIG. 14) so that the lead may be appropriately connected with the aid of the fourth and fifth robot devices 710, 720, respectively.

Figure 15A:
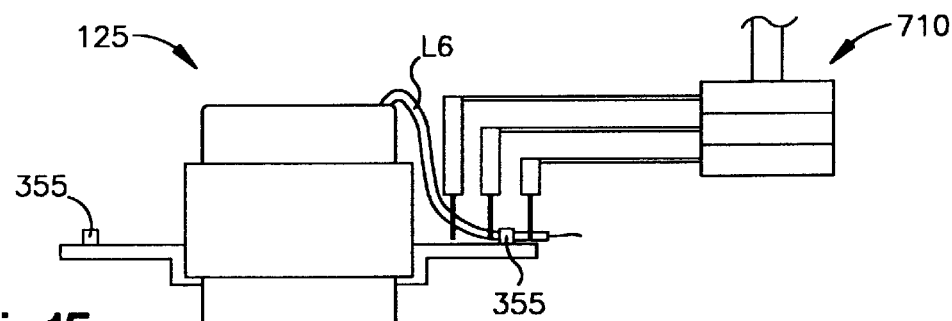
FIG. 15a is a side view of a robotic arm selecting a lead for splicing by the crimping tool.
Figure 15B:
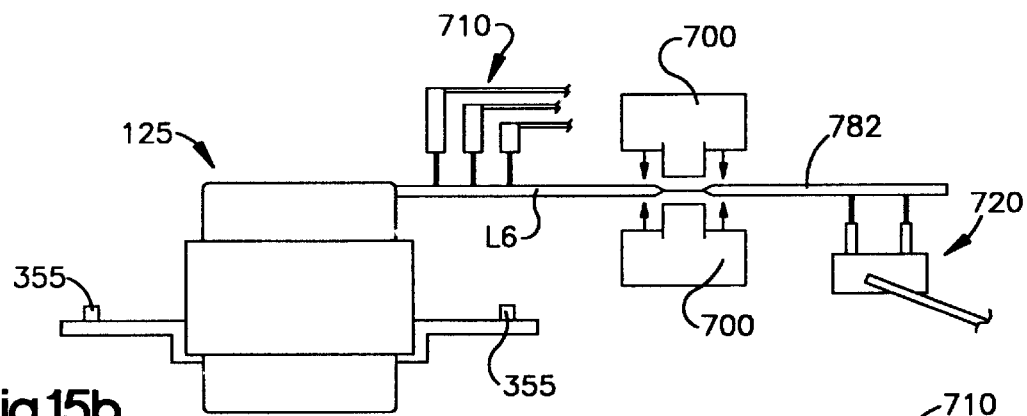
FIG. 15b is a side view of a crimping tool splicing a lead to a threaded lead.

For example, as shown in FIG. 15a, lead L6 has been introduced to the crimping station 780 and initially is removed from its clip by robot device 710. The manner in which the robot device 710 removes the lead L6 is similar to that described above with respect to FIG. 11a. Next, with respect to FIG. 15b, the robot device 710 positions the lead L6 in one end of the crimping tool 700. During the time robot device 710 positions the lead L6 within the crimping tool 700, robot device 720 retrieves a cut portion of a stranded lead wire 782 from the spool of threaded lead wire 725 in a manner similar to that described above with respect to robot device 505 retrieving a sleeve 620 from spool 590. Further the robot device 720 positions the stranded lead wire 782 into the crimping tool 700. Once both lead L6 and the stranded lead wire 782 are positioned within the crimping tool 700, the crimping tool 700 splices the leads together.

Figure 15C:
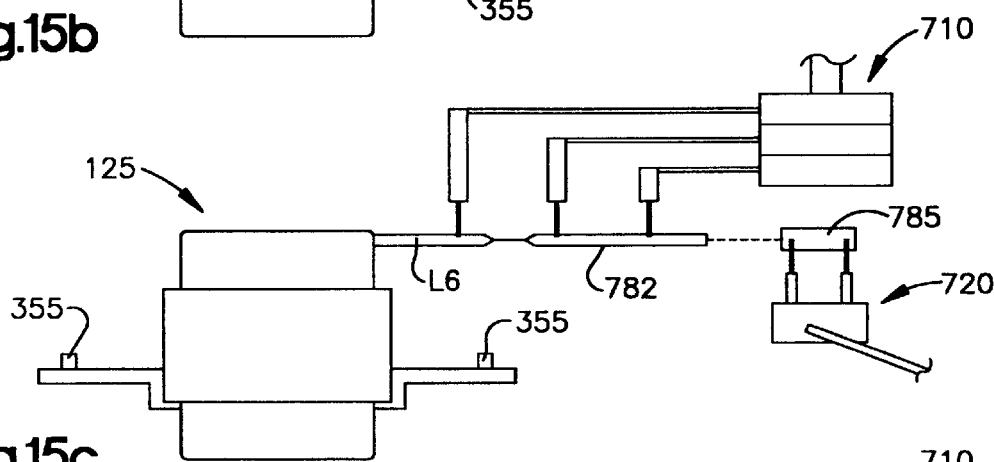
FIG. 15c is a side view of a robot device positioning a splice insulator sleeve for insertion over a spliced lead.
Figure 15D:
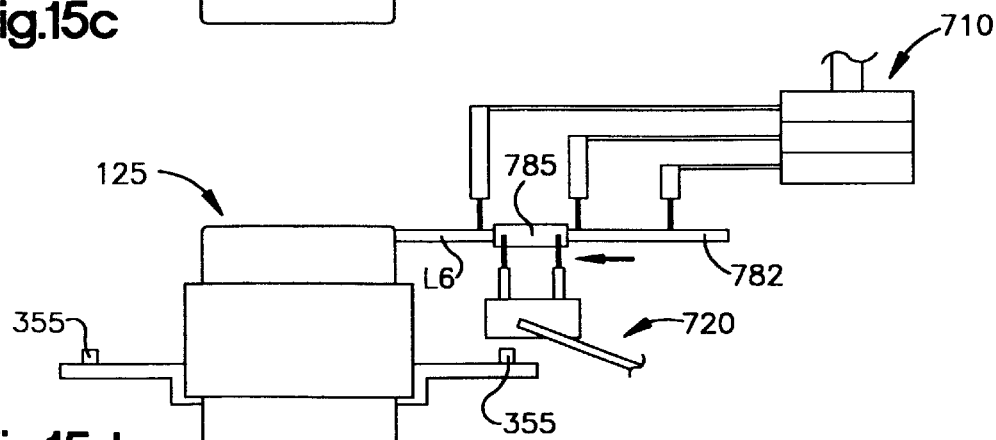
FIG. 15d is a side view of the splice insulator coupled to the spliced lead.

Next, as shown in FIG. 15c, the fifth robot device 720 retrieves a cut sleeve 785 from the spool of sleeve material 730 to serve as a splice insulator. The sleeve 785 includes a receiving aperture sized sufficiently large to fit over the stranded lead 782. Thus, as shown in FIG. 15d, the fifth robot device 720 positions the sleeve 785 over the splice connection in a manner similar that described above with respect to FIGS. 11a–11f. Once positioned over the splice connection, the fifth robot device 720 uses its finger to squeeze the sleeve 785 into place thereby insulating the splice connection. Once completed, the robot devices 710, 720 reposition the lead(s) into the clamp 355 from which it was removed and returns to the crimping station 780 to await the next group of leads 150. In the present embodiment, each stranded lead 782 spliced to a lead wire 150 includes a different number or other identifying indicia pre-printed on its outer insulation in order that an operator may distinguish between different leads 150 after lacing.

If the next group of leads 150 is a group which is to be jumpered together rather than spliced to a threaded lead, the computer system 600 directs the fourth robot device 710 to position the leads into the crimping tool 700 and directly connect the leads together. This process of jumper connecting and splicing wires continues until all of the groups of leads have been appropriately handled in accordance with the instructions received from the computer.

Figure 16:
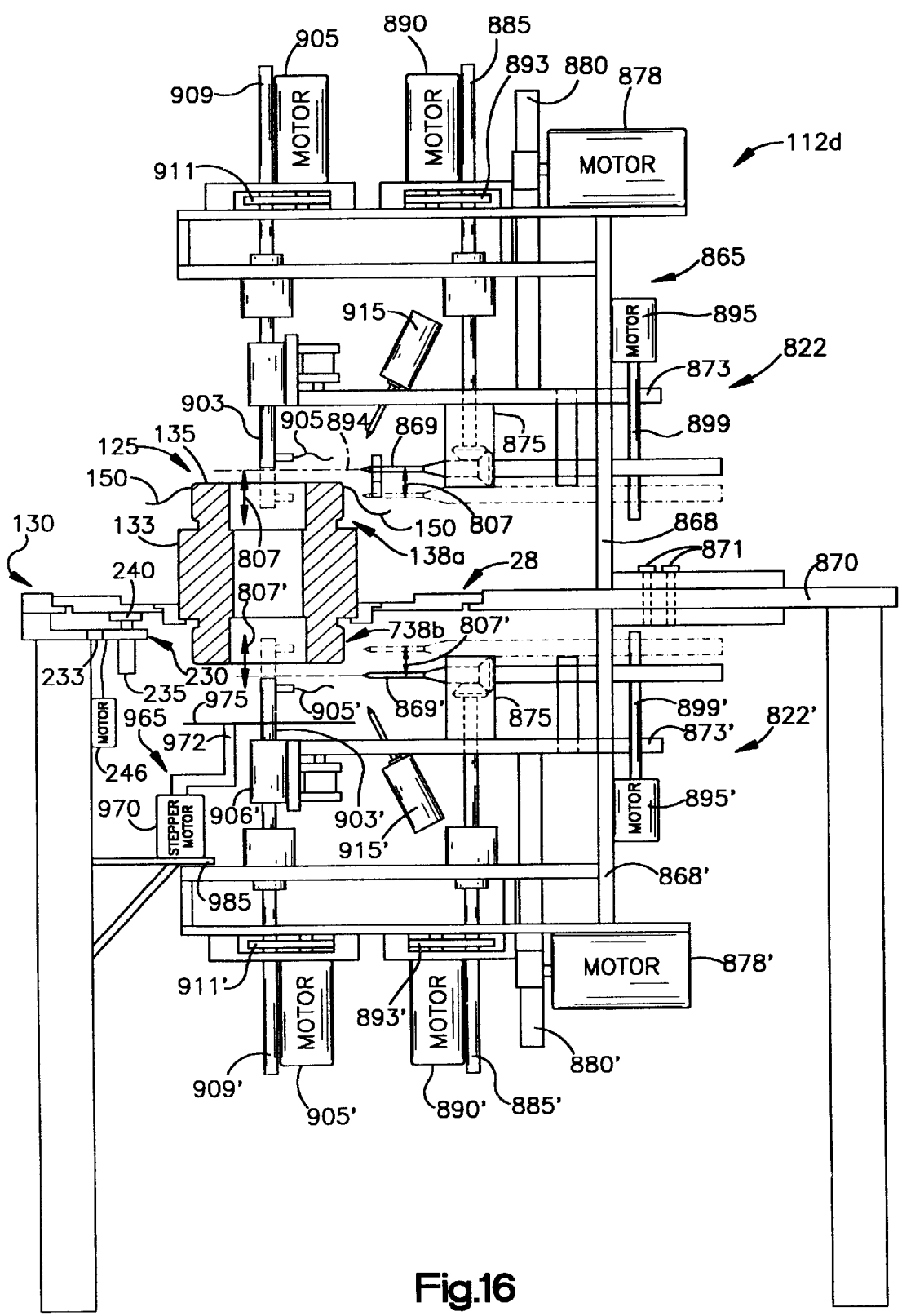
FIG. 16 is a side elevation view partly in section of the stator introduced to the lacting station.

Turning now to FIG. 16, the fourth station 112d at which lacing occurs is shown in more detail. The fourth station 112d includes a lacing machine 865 for lacing the end windings 135 and leads 150 of the stator 125. The lacing machine 865 includes an upper lacing section 822 and a lower lacing section 822'. Both the upper lacing section 822 and the lower lacing section 822' include corresponding components for lacing of the upper portion 138a and lower portion 138b of the end windings 135, respectively. Thus, components of the lower lacing section 822' which correspond to components of the upper lacing section 822 are identified with the same reference numeral but with a prime "'". For sake of brevity, the following description will discuss only the components of the upper lacing section 822, however, it will be appreciated that the components of the lower lacing section 822' are similarly connected and configured as shown in FIG. 16.

The upper section 822 of the lacing machine 865 is mounted to a frame 868 which is secured to a lacing table 870 using mounting bolts 871 or other conventional securing techniques such as screws, adhesives, etc. The lacing machine 865 includes a positionable lacing needle 869 for lacing of the end windings 135 on the upper portion 138a of the metal core 133. The lacing needle 869 is secured to vertical movement platform 873 of the frame structure 868 via needle housing 875. The platform 873 is coupled to vertical movement motor 878 via support rod 880. The vertical movement motor 878 serves to raise and lower the platform 873 thereby allowing for vertical positioning of the lacing needle 869. Rotational positioning of the lacing needle 869 is accomplished by way of rotation rod 885 and rotation motor 890. More particularly, rotation rod 885 connects at one end to rotation motor 890 via gear assembly 893 and at the other end to lacing needle 869. Thus, upon operation of the rotation motor 890, the rotation rod 885 causes the lacing needle 869 to rotate about an axis 894 to a desired position for lacing of the end windings 135. The lacing needle 869 is also coupled to threading motor 895 via threading rod 899. The threading motor 895 and threading rod 899 provides the lacing needle 869 with in/out movement in a direction substantially parallel to axis 894 of the lacing needle 869.

The lacing machine 65 further includes a bobbin 903 for providing and directing a lacing cord 905 to an appropriate position with respect to the coil windings 135 to allow lacing to take place. A rotational direction of the bobbin 903 is controlled by bobbin motor 906 via bobbin control rod 909. The bobbin control rod 909 couples to the bobbin motor 905 via gear assembly 911 which rotates the bobbin control rod 909 in response to operation of the bobbin motor 905. Similar to the lacing needle 869, vertical positioning of the bobbin 905 is achieved by way of the vertical movement motor 878 appropriately positioning the platform 73 to which the bobbin 905 is secured. More particularly, as shown in phantom in FIG. 16, the vertical movement motor 878 allows both the bobbin 903 and lacing needle 869 to be positioned above or below the upper end 138a of the stator coil end windings 135 during lacing as indicated by arrows 807. Thus, for example, the bobbin 903 may be positioned inside or outside of a cavity defined by the end winding 135. It will be appreciated that while the present embodiment shows the vertical positioning of the bobbin 903 and lacing needle 869 to be controlled by the same motor 868, a separate stepper motor or other device could additionally or alternatively be coupled to each to allow for individual vertical positioning of the bobbin 903 and the lacing needle 869.

Also secured to the frame 868 is threading assembly 915. The threading assembly 915 is secured to the platform 873 and moves in conjunction with the vertical positioning of the platform 873 as controlled by vertical movement motor 878. The threading assembly 915 includes a clamp (not shown) for securing the lacing cord 905 during certain portions of the lacing cycle and includes a shear (not shown) for cutting the lacing cord 905 as needed during the lacing cycle. Interaction between the bobbin 903, lacing needle 869, and threading assembly 915 is generally known in the art and is therefore not discussed in greater detail for sake of brevity.

Also included at the forth station 112a is a vertical positioning device 965 (FIGS. 16 and 3). The vertical positioning device 965 is used to aid in placement of the leads 150 during lacing as discussed in more detail below. The vertical positioning device 965 includes a stepper motor 970 having a lift member 972 extending therefrom and a lead lift plate 975. The lead lift plate 975 is rigidly secured to a top of the lift member 972. The stepper motor 970 provides for movement of the lead lift plate 975 in substantially a vertical direction as depicted by arrows 983. The stepper motor 970 is situated on platform 985 (FIG. 16) which is secured to the lacing table 870 using conventional techniques.

In operation, the present invention provides for an automated stator lacing process which minimizes the amount of operator intervention needed to lace the end windings 135 and leads 150 of the stator 125. More particularly, lacing of the end windings 135 and leads 150 is performed during an automated process which occurs while the stator is situated on the pallet 128 during a manufacturing cycle. Thus, it is not necessary for an operator to lift the stator 125 from the pallet 128 and place the stator 125 over an arbor of a separate lacing machine. Furthermore, the automated lacing process automatically laces the end windings 135 and leads 150 of the stator 125 according to a predefined lacing pattern to ensure that the leads 150 extend from the end windings 135 at one or more desired locations without the need for an operator to manually guide the leads 150 during lacing.

The stator 125 is placed on pallet 128 at a first station at the start of a manufacturing process and is moved by the conveyer system 130 from one station to the next. In order to stabilize the stator 125 from movement, the metal core 133 is placed on the recessed step 379 of the inner ring 320. Additionally, in order to reduce the risk that the stator 125 is not inadvertently rotated or moved by the inner ring 320 upon which the stator 125 is situated, both the inner ring 320 and outer ring 315 are secured from rotational movement using spring loaded locking pin 316 (FIG. 2). The locking pin 316 is movably mounted to a lower portion of the platform 128 adjacent an area where the slidable gear assembly 240 engages with the outer ring 315. A spring (not shown) associated with the locking pin 316 provides sufficient force to engage the locking pin 316 between a pair of gear teeth on the outer ring 315 when the slidable gear assembly 240 is not engaged. When the slidable gear assembly 230 is engaged, the traction plate 245 of the slidable gear assembly 230 engages with the locking pin 316 so as to move the locking pin 316 away from the gear teeth on the outer ring 315 thereby allowing for rotation of the inner ring 320 and outer ring 35 by the drive gear 240.

Upon introduction of pallet 128 to the fourth station 112d, the slidable gear assembly 230 engages with the outer gear teeth 330 of the outer ring 315. Once engaged, the locking pin 316 unlocks the outer ring 315 and inner ring 320 such that each may rotate about central axis A. Prior to lacing, the lacing needle 869 automatically is positioned to a predetermined position adjacent the stitch window 460 using motors 890 and 878. Of course, an operator may adjust the placement of the lacing needle 869 via an operator control panel (not shown) if desired.

Referring now to FIGS. 17a–17f, an embodiment of the present invention is shown in which lacing of the end windings 135 and leads 150 occurs such that the leads 150 ultimately extend from the end windings 135 at two points spaced 180° apart from one another. It will be appreciated that while FIGS. 17a–17f primarily focus on the end windings 135 on the upper end 138a (FIG. 1a) of the metal core 133, the end windings 135 on the lower end 138b of the metal core 133 are laced similarly by the lacing machine 865. Starting with FIG. 17a, stator 125 is shown situated on pallet 128 just prior to the beginning of a lacing process at lacing station 120. In this particular embodiment there is shown two sets of leads 150, however, it will be appreciated that the stator 125 may include any number of sets of leads 150. As discussed above, each of the sets of leads 150 is clipped to a predefined clip 355 on the outer ring 315 . The clips 355 provide tension to the leads 150 while still allowing the leads 150 to be pulled through the clip 355 when taken up during the lacing process. In order to facilitate proper placement of the leads 150 during lacing, the vertical positioning device 965 (FIG. 16) raises the ring portion 453 of the lead lift assembly 450 prior to rotation of the stator 125. In order to raise the ring portion 453, the stepper motor 970 raises the lead lift plate 975 such that the lead lift plate 975 engages the three legs 458 of the lead lift assembly 450. The lead lift plate 975 then lifts the ring portion 453 via the legs 450 until the ring portion 453 substantially is flush with a top of the end windings 135 as depicted in FIG. 7a. As the ring portion 453 of the lead lift assembly 450 is raised, a portion of the leads 150 are also lifted by the ring portion 453. Once the lead lift assembly 450 is raised, rotation of the stator 125 and lacing by the lacing needle 869 begins.

Referring now to FIG. 7b, the outer ring 315 and inner ring 320 initially are rotated 90° in a counter clockwise direction. Rotation of the outer ring 315 is accomplished by way of the bi-directional motor 235 rotating the drive gear 240 in a clockwise direction an appropriate number of revolutions. As discussed above, the gear assembly 350 provides for the outer ring 315 to rotate the inner ring 320 an equal amount. During rotation, the lacing needle 869 is controlled via threading motor 895 and laces the end windings 135 and leads 150 which are presented to the stitch window 460. Because the stator 125 and clips 355 are rotated while the lead lift assembly 450 remains stationary, the hook 455a of the lead lift assembly 450 catches the lead 150a and positions the lead 150a in the stitch window 460 such that a portion of the lead 150a is laced to the end windings 135 as depicted by lead stitched portion 1075a. The clips 355 facilitate the leads 150 remaining tense during the lacing process so that the leads 150 may be properly positioned by hooks 455.

Next, as shown in FIG. 7c, the drive gear 240 rotates the outer and inner rings 315, 320, respectively, 180° degrees in a clockwise direction. Again, during this rotation the lacing needle 869 continues to lace end windings 135 and leads 150 introduced to the stitch window 460. Thus, in this particular embodiment, the lacing needle 869 double stitches the end windings 135 and lead 150a in the region represented by lead stitched portion 475a during the first 90° clockwise rotation and then continues to lace a new portion of the end windings 135 during the remaining 90° clockwise rotation.

Next, as shown in FIG. 7d, the lead lift assembly 450 is lowered by the vertical positioning device 965 by virtue of the stepper motor 970 lowering the lead lift plate 975 (FIG. 3). Following lowering of the lead lift plate 975, the drive gear 240 rotates the stator 125 such that the stator 125 is rotated 180° from its initial start point in FIG. 7a. During this rotation, the lacing needle 869 is not active. Following the 180° rotation, the lead lift assembly 450 is again raised by the stepper motor 970 such that the ring portion 453 substantially is flush with the top portion of the end windings 135.

Figure 18:
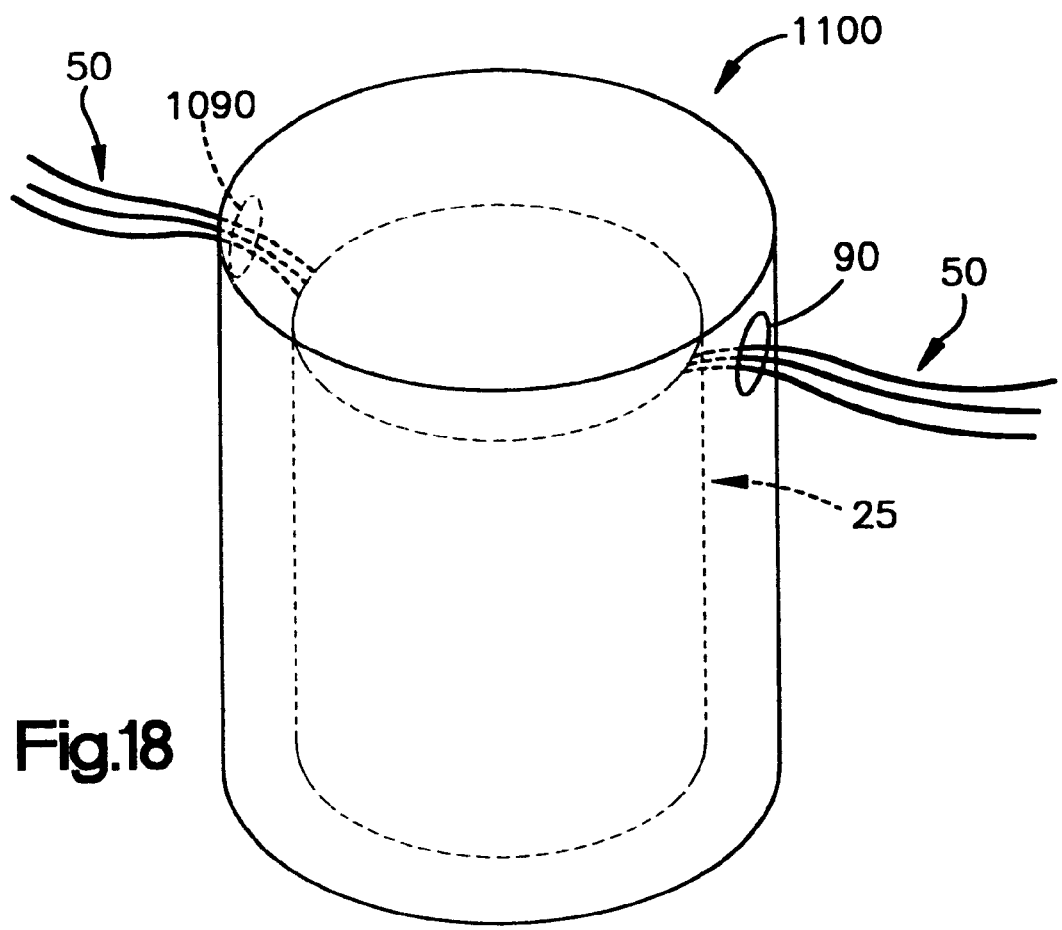
FIG. 18 is a perspective view of the stator disposed in a stator housing.

Referring now to FIG. 7e, the drive gear 240 again rotates the outer ring 315 and inner ring 320 90° in a counterclockwise direction. During this rotation, the lacing needle 869 stitches the lead 150b to the end windings 135 along a region depicted by lead stitched portion 475b. Finally, as shown in FIG. 7f, the drive gear 240 rotates the outer ring 315 and inner ring 320 in a 180° clockwise direction. Similar to that described above with respect to FIG. 7c, during the first 90° clockwise rotation the lacing needle 69 double stitches the end windings 135 and leads 150b over the region depicted by lead stitched portion 475b. During the remaining 90° degree rotation the lacing needle 869 stitches the remaining end windings 135 introduced to the stitch window 360. Following the final 180° clockwise rotation, the lacing protocol is completed and the end windings 135 on both the upper end 138a and lower end 138b of the metal core 133 are laced about the entire 360° circumference of the metal core 133. It will be appreciated that the leads 150a, 150b are laced to the end windings 135 such that each set of leads 150a, 150b departs from the stator 125 at a desired location which in the present embodiment is at opposite points along a circumference of the end windings 35. Often times the points at which each set of leads 150a, 150b is configured to depart from the end windings 135 will correspond to one or more lead apertures 1090 predefined in a stator housing 1100 as shown in FIG. 18. In this manner, the leads 150 remain easily accessible to an operator after the stator 125 has been placed into its housing 1100. Following completion of the lacing protocol, the stepper motor 970 lowers the lead lift assembly 950 by way of lowering the lead lift plate 975. During lowering, the springs 473 (FIG. 3) also provide a downward force on the lead lift assembly 450 to facilitate proper retraction of the lead lift assembly 450. Finally, the slidable gear assembly 230 is retracted from the outer ring 320 using motor 246 and the locking pin 316 is engaged to facilitate the outer ring 315 and inner ring 320 not rotating as the pallet 128 is moved by the conveyer system 130 to the next station in the manufacturing cycle.

Figure 17A:
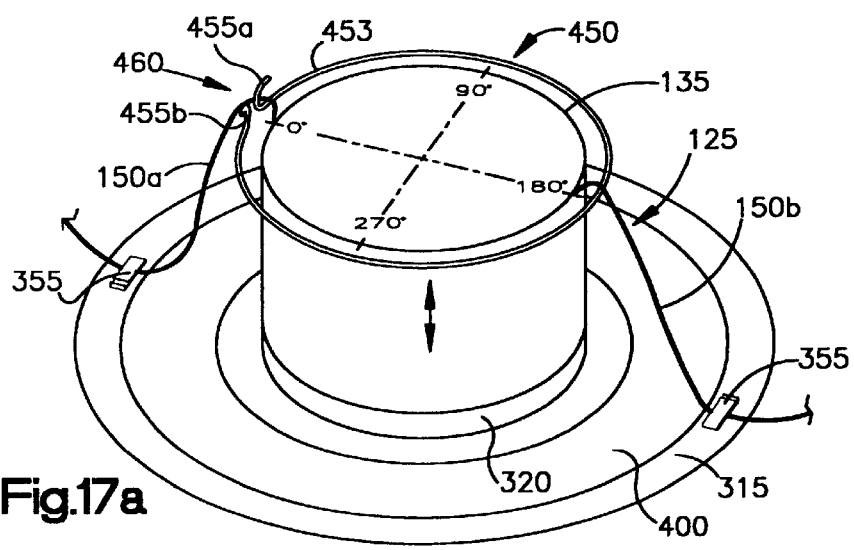
FIG. 17a is a perspective view of the stator prior to the commencement of the lacing process.
Figure 17B:
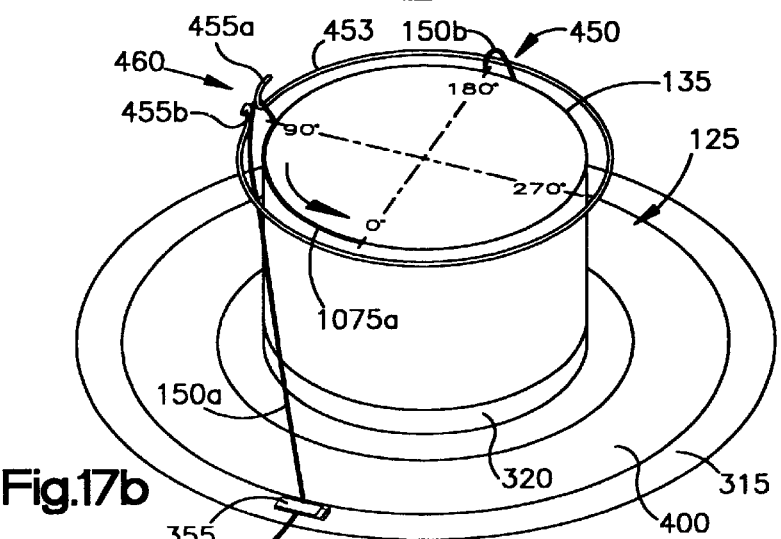
FIG. 17b is a perspective view of the stator after a 90° counter-clockwise rotation during the lacing process.
Figure 17C:
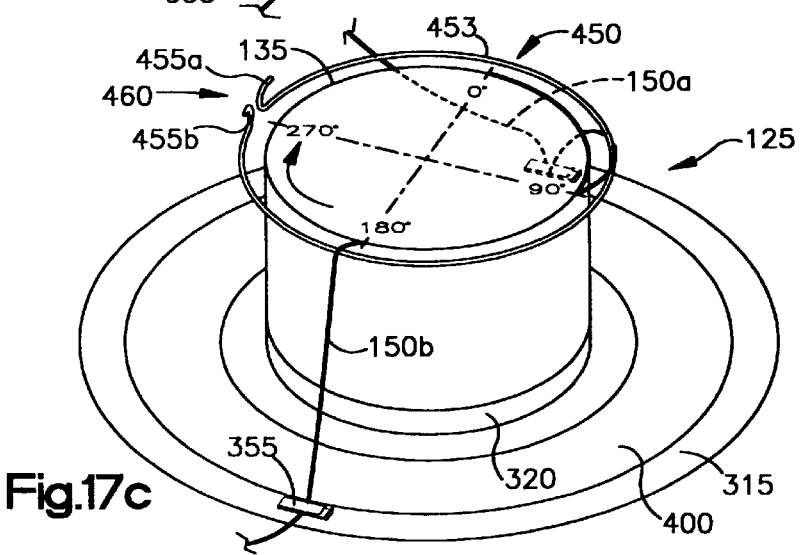
FIG. 17c is a perspective view of the stator after a 180° clockwise rotation during the lacing process.
Figure 17D:
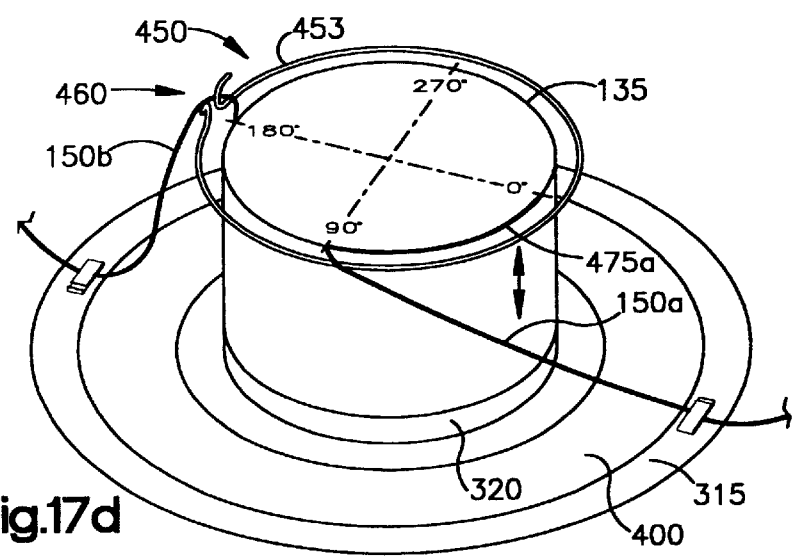
FIG. 17d is a perspective view of the stator after being reset 180° from its start point during the lacing process.
Figure 17E:
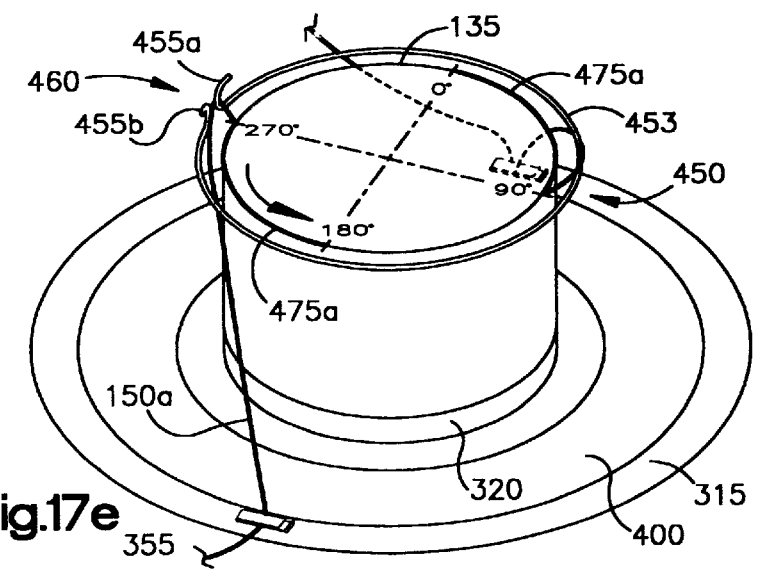
FIG. 17e is a perspective view of the stator after a 90° counter clockwise rotation during the lacing process.
Figure 17F:
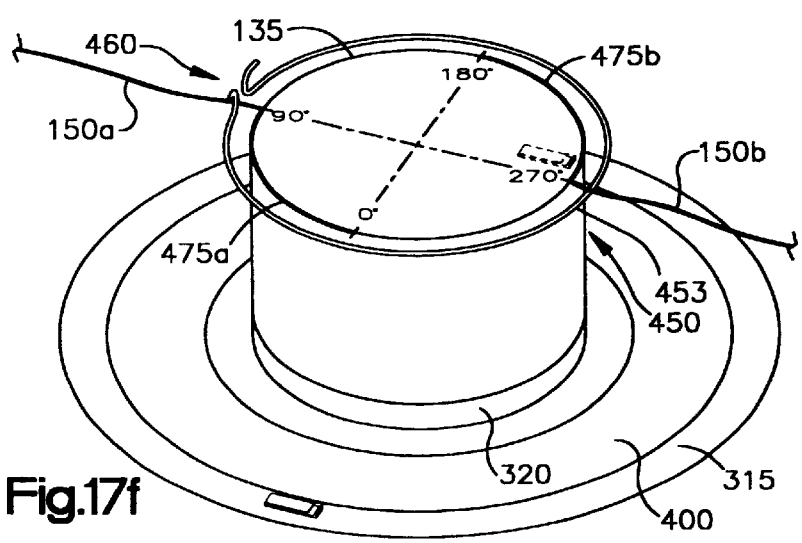
FIG. 17f is a perspective view of the stator after a 180° clockwise rotation during the lacing process.

While the present embodiment shows a stator 125 having two sets of leads 150a and 150b, it will be appreciated that if three or more sets of leads 150 were included on the stator 215, all of the sets of leads 150 would still have departed from the stator 125 at one of the two points shown in FIG. 17f. Furthermore, by rotating the stator 125 in both clockwise and counter clockwise directions and by resetting the stator positioning as shown with respect to FIG. 17g, the present embodiment provides for a lacing technique which reduces the area in which leads 150 overlap on the end windings 135 during lacing. While overlapping of leads 150 during lacing does not effect the operations of the stator 125, it may in some instances provide the end windings 135 of the stator to have areas of higher or lower elevation thereby making it more difficult to properly fit the stator 125 in the stator housing 1100.

In an alternative embodiment of the present invention, it may be desirable to lace the end windings 135 and leads 150 such that the leads 150 all depart from the stator 125 at a single point. In such a case, the lacing protocol may, for example, be set to rotate the outer ring 315 and inner ring 320 in a 360° clockwise or counter clockwise direction while the lacing needle 69 laces in the stitch window 460. Alternatively, to reduce lead 150 overlap on the end windings 135, the lacing protocol may rotate the stator 125 180° in a first direction, and then reset the stator 125 to its original position and finally rotate the stator 180° in the opposite direction. Similarly, a number of other lacing protocols may alternatively be used.

In still other alternative embodiment of the present invention, it may be desirous to have leads 150 depart from the stator 125 at three or more points about a circumference of the end windings 135. For example, if it were desirous to have three depart points, the drive gear 240 may rotate the outer ring 315 and inner ring 320 in three 120° rotations during which lacing by lacing needle 869 is reset between each 120° rotation to provide for three lead depart points.

Similarly, if four or more depart points were desired, the drive gear 240 and lacing needle 869 may be configured to, rotate and lace the end windings 135 and leads 150 as needed. It will be appreciated that the present invention is intended to cover all such lacing protocols.

The invention has been described with reference to the preferred embodiments. Obviously, modifications and alterations will occur to others upon reading and understanding the preceding detailed description. For example, while the above embodiments depict robotic devices having three finger clamps, it is possible to utilize robotic devices having one or more finger clamps. Further, while the above embodiments show the ring portion 453 of the lead lift assembly 450 to include only one pair of hooks 455 defining a single stitch window 460, it will be appreciated that the lead lift assembly 450 may include additional hooks 455 defining multiple stitch windows. Additionally, while the above embodiments show a single drive gear 240 to drive both the outer ring 315 and inner ring 320, it will be appreciated that separate drive gears could alternatively be used for each of the rings 315, 320. It is intended that the invention be construed as including all such modifications and alterations, and equivalents thereof and is limited only by the scope of the following claims.

What is claimed is:

1. A method for grouping a plurality of leads of a stator situated on a pallet, the pallet having a rotatable assembly including a plurality of lead securing devices, the method comprising the steps of:

positioning one of the plurality of leads secured to a first of the plurality of lead securing devices to a predetermined position;

removing the one of the plurality of leads from the first of the plurality of lead securing devices;

rotating a second of the plurality of lead securing devices to the predetermined position; and securing the one of the plurality of leads to the second of the plurality of lead securing devices.

2. The method of claim 1, wherein the step of removing the one of the plurality of leads is by way of a robotic device.

3. The method of claim 1, wherein the step of rotating includes the step of engaging the rotatable assembly with a slidable gear assembly having a drive gear for providing rotational force.

4. The method of claim 1 wherein the lead securing devices are clips.

5. The method of claim 4, wherein the clips include a base portion and a cord securing member.

6. The method of claim 5, wherein the cord securing member is folded across a top surface of the base portion to provide a downward force against the top surface for releasably securing items therebetween.

7. The method of claim 1, wherein the step of securing the one of the plurality of leads includes using a robotic device.

8. The method of claim 1, wherein more than one of the plurality of leads is secured under one lead securing device.

9. The method of claim 1, wherein only one of the plurality of leads is secured under one lead securing device.

10. The method of claim 1, wherein a processor determines the predetermined position.

11. A method for grouping a plurality of leads of a stator situated on a pallet, the pallet having a rotatable assembly including a plurality of lead securing devices, the method comprising:

automatically removing at least one of a plurality of leads from one of the lead securing devices;

automatically securing the at least one of a plurality of leads to a different lead securing device;

wherein the lead securing devices are clips, the clips including a base portion and a cord securing member, and the cord securing member being folded across a top surface of the base portion to provide a downward force against the top surface for releasably securing items therebetween; and repeating the steps of removing and securing until the plurality of leads are grouped according to a predetermined grouping protocol.

12. The method of claim 11, wherein the predetermined grouping protocol is determined by a computer.

\* \* \* \* \*